United States Patent
Holz et al.

(10) Patent No.: US 10,650,270 B2
(45) Date of Patent: May 12, 2020

(54) METHODS AND SYSTEMS FOR SIMULTANEOUS LOCALIZATION AND CALIBRATION

(71) Applicant: X Development LLC, Mountain View, CA (US)

(72) Inventors: Dirk Holz, Mountain View, CA (US); Troy Straszheim, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 282 days.

(21) Appl. No.: 15/727,726

(22) Filed: Oct. 9, 2017

(65) Prior Publication Data

US 2018/0307941 A1 Oct. 25, 2018

Related U.S. Application Data

(60) Provisional application No. 62/488,639, filed on Apr. 21, 2017.

(51) Int. Cl.
*G06K 9/62* (2006.01)
*G01C 21/20* (2006.01)
(Continued)

(52) U.S. Cl.
CPC ............ *G06K 9/6214* (2013.01); *B66F 9/00* (2013.01); *B66F 9/063* (2013.01); *B66F 9/0755* (2013.01);
(Continued)

(58) Field of Classification Search
CPC combination set(s) only.
See application file for complete search history.

(56) References Cited

U.S. PATENT DOCUMENTS

| 7,311,406 B2 * | 12/2007 | Schofield | B60N 2/002 |
| | | | 359/604 |
| 7,425,076 B2 * | 9/2008 | Schofield | B60N 2/002 |
| | | | 359/604 |

(Continued)

OTHER PUBLICATIONS

Rainer Kummerle et al. ("Simultaneous Parameter Calibration, Localization, and Mapping," Advanced Robotics, vol. 26, No. 17, Sep. 13, 2012, pp. 2012-2041) (Year: 2012).*

(Continued)

*Primary Examiner* — Anand P Bhatnagar
(74) *Attorney, Agent, or Firm* — McDonnell Boehnen Hulbert and Berghoff LLP

(57) ABSTRACT

Examples relate to simultaneous localization and calibration. An example implementation may involve receiving sensor data indicative of markers detected by a sensor on a vehicle located at vehicle poses within an environment, and determining a pose graph representing the vehicle poses and the markers. For instance, the pose graph may include edges associated with a cost function representing a distance measurement between matching marker detections at different vehicle poses. The distance measurement may incorporate the different vehicle poses and a sensor pose on the vehicle. The implementation may further involve determining a sensor pose transform representing the sensor pose on the vehicle that optimizes the cost function associated with the edges in the pose graph, and providing the sensor pose transform. In further examples, motion model parameters of the vehicle may be optimized as part of a graph-based system as well or instead of sensor calibration.

20 Claims, 12 Drawing Sheets

(51) Int. Cl.
  *G05D 1/02* (2020.01)
  *B66F 9/00* (2006.01)
  *G06K 9/00* (2006.01)
  *B66F 9/075* (2006.01)
  *G06K 9/68* (2006.01)
  *B66F 9/06* (2006.01)

(52) U.S. Cl.
  CPC ........... *G01C 21/20* (2013.01); *G01C 21/206* (2013.01); *G05D 1/024* (2013.01); *G05D 1/0244* (2013.01); *G05D 1/0274* (2013.01); *G06K 9/00664* (2013.01); *G06K 9/00791* (2013.01); *G06K 9/6892* (2013.01); *G05D 2201/0216* (2013.01); *G06T 2207/30244* (2013.01); *G06T 2207/30248* (2013.01); *G06T 2207/30252* (2013.01)

(56) References Cited

U.S. PATENT DOCUMENTS

| | | | | |
|---|---|---|---|---|
| 8,254,635 | B2* | 8/2012 | Stein | G06K 9/00798 382/103 |
| 9,733,090 | B2* | 8/2017 | Simpson | G01C 21/3438 |
| 10,054,447 | B2* | 8/2018 | Hong | G01C 21/20 |
| 10,145,693 | B2* | 12/2018 | Asai | G01C 21/30 |
| 10,267,635 | B2* | 4/2019 | Chen | B60W 40/06 |
| 2010/0262359 | A1* | 10/2010 | Motoyama | G01C 21/32 701/532 |
| 2018/0188039 | A1* | 7/2018 | Chen | G01C 21/3694 |
| 2018/0202815 | A1* | 7/2018 | Asai | G01C 21/30 |

OTHER PUBLICATIONS

Kummerle, Rainer et al., "Simultaneous Parameter Calibration, Localization and Mapping," Advanced Robotics, vol. 26, No. 17, dated Sep. 13, 2012, pp. 2021-2041.

Heng, Lionel et al., "Self-Calibration and Visual SLAM with Multi-Camera System on A Micro Aerial Vehicle," Proceedings Robotics Science and Systems (RSS), dated Jul. 19, 2015, pp. 1-10.

International Search Report issued in co-pending International Patent Application No. PCT/US2018/022396, European Patent Office, dated Jul. 2, 2018, 6 pages.

Written Opinion issued in co-pending International Patent Application No. PCT/US2018/022396, European Patent Office, dated Jul. 2, 2018, 12 pages.

* cited by examiner

METHODS AND SYSTEMS FOR SIMULTANEOUS LOCALIZATION AND CALIBRATION

CROSS REFERENCE TO RELATED APPLICATION

The present patent application claims priority to U.S. Provisional Patent Application Ser. No. 62/488,639, filed on Apr. 21, 2017, the entire contents of which are hereby incorporated by reference.

BACKGROUND

Commercial entities, such as manufacturers, wholesalers, and transport businesses, often use warehouses to store items, such as raw materials, parts or components, packing materials, and finished products. A warehouse can enable the organization of items through use of pallets and pallet racks to store numerous pallets holding various items in a manner that permits for easier access and efficient processing. As such, a warehouse may use various types of pallets, which are flat transport structures configured to hold items for transportation by vehicles and other equipment operating in the warehouse.

Traditionally, human operators may operate machines, vehicles, and other equipment within the warehouse. For instance, a human operator may navigate a forklift to lift and transport pallets between a delivery area and storage. However, with continuous advancements in sensors, computing power, and other technologies, companies are switching to autonomous and semi-autonomous vehicles for performing operations within warehouses rather than relying on human operators.

SUMMARY

Example implementations relate to methods and systems for simultaneous localization and calibration. More specifically, a sensor on a vehicle may be calibrated (e.g., by determining a position and orientation of the sensor on the vehicle) as part of a graph-based localization and mapping system. An example implementation may involve using sensor data indicative of multiple markers placed within an environment received detected by a sensor coupled on a vehicle located at various vehicle poses within the environment. The implementation may further involve determining a pose graph representing the various vehicle poses and the marker locations. In some examples, the pose graph may include a number of edges associated with a cost function representing a distance measurement between matching marker detections at different vehicle poses. The distance measurement may incorporate a sensor pose on the vehicle. The implementation may then involve determining a sensor pose transform representing the sensor pose on the vehicle that optimizes the cost function associated with the edges in the pose graph. In further examples, motion model parameters of the vehicle may be optimized as part of a graph-based system as well or instead of sensor calibration.

In one aspect, an example method is provided. The method may include receiving sensor data indicative of a plurality of markers detected by a sensor on a vehicle located at a plurality of vehicle poses within an environment, and determining a pose graph representing the plurality of vehicle poses and the plurality of markers. The pose graph may include a plurality of edges associated with a cost function representing a distance measurement between a matching marker detection at different vehicle poses. For instance, the distance measurement may incorporate the different vehicle poses and a sensor pose on the vehicle. The method may further include determining a sensor pose transform representing the sensor pose on the vehicle that optimizes the cost function associated with the plurality of edges in the pose graph, and providing the sensor pose transform representing the sensor pose on the vehicle.

In another aspect, an example system is provided. The system may include a vehicle, a sensor coupled to the vehicle, a computing system, a non-transitory computer readable medium, and program instructions stored on the non-transitory computer readable medium and executable by the computing system to receive sensor data indicative of a plurality of markers detected by the sensor on the vehicle located at a plurality of vehicle poses within an environment, and to determine a pose graph representing the plurality of vehicle poses and the plurality of markers. For instance, the pose graph may include a plurality of edges associated with a cost function representing a distance measurement between a matching marker detection at different vehicle poses, and the distance measurement may incorporate the different vehicle poses and a sensor pose on the vehicle. The computing system may also determine a sensor pose transform representing the sensor pose on the vehicle that optimizes the cost function associated with the plurality of edges in the pose graph, and provide the sensor pose transform representing the sensor pose on the vehicle.

In a further aspect, a non-transitory computer readable medium is provided. The non-transitory computer readable medium has stored therein instructions executable by a computing system to cause the computing system to perform operations. The operations may include receiving sensor data indicative of a plurality of markers detected by a sensor on a vehicle located at a plurality of vehicle poses within an environment, and determining a pose graph representing the plurality of vehicle poses and the plurality of markers. For instance, the pose graph may include a plurality of edges associated with a cost function representing a distance measurement between a matching marker detection at different vehicle poses, and the distance measurement may incorporate the different vehicle poses and a sensor pose on the vehicle. The operations may further include determining a sensor pose transform representing the sensor pose on the vehicle that optimizes the cost function associated with the plurality of edges in the pose graph, and providing the sensor pose transform representing the sensor pose on the vehicle.

In yet another aspect, a system is provided. The system may include means for localization and calibration. In particular, the system may include means for receiving sensor data indicative of a plurality of markers detected by a sensor on a vehicle located at a plurality of vehicle poses within an environment, and means for determining a pose graph representing the plurality of vehicle poses and the plurality of markers. In some instances, the pose graph may a plurality of edges associated with a cost function representing a distance measurement between a matching marker detection at different vehicle poses, and the distance measurement may incorporate the different vehicle poses and a sensor pose on the vehicle. The system may also include means for determining a sensor pose transform representing the sensor pose on the vehicle that optimizes the cost function associated with the plurality of edges in the pose graph, and means for providing the sensor pose transform representing the sensor pose on the vehicle.

These as well as other aspects, advantages, and alternatives will become apparent to those of ordinary skill in the

DETAILED DESCRIPTION

Figure 1:
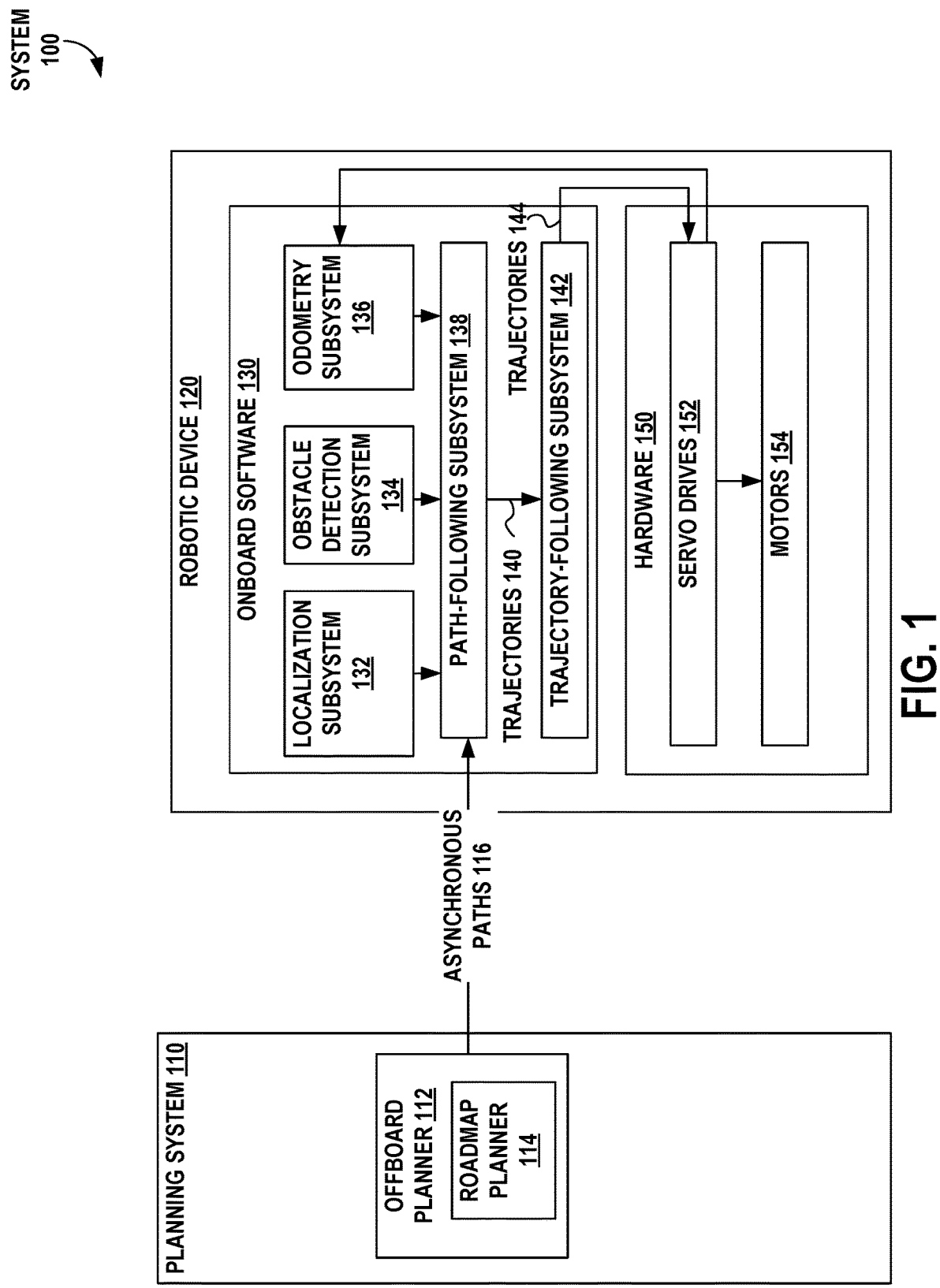
FIG. 1 is a block diagram of a system, in accordance with an example embodiment.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features.

The example implementations described herein are not meant to be limiting. It will be readily understood that aspects of the present disclosure, as generally described herein, and illustrated in the figures, can be arranged, substituted, combined, separated, and designed in a wide variety of different configurations, all of which are explicitly contemplated herein.

I. OVERVIEW

Advancements in computing and sensor capabilities have helped contribute to an increase in the deployment of robotic devices (robots) to perform operations within warehouses and other types of environments. Although some operations can be performed by stationary robots, many tasks often require a robot to successfully navigate between multiple positions. Therefore, in order to complete tasks, a mobile robot may require a substantial understanding of the environment.

In practice, various methods may be used to develop information for a mobile robot to use to navigate an environment effectively. Particularly, a mobile robot may rely upon one or more maps of the space that can enable its control system to determine proper navigation strategies around physical boundaries.

To develop a map of an environment, an example method may involve manually surveying the environment to determine the positions of various landmarks that a robot may use during navigation. Landmarks represent detectable features in the environment that can be used for position and orientation reference. For example, a warehouse may include retroreflective markers (markers) or other infrastructure positioned at heights detectable by sensors on robots and at particular locations to help guide the robots. Markers and other possible landmarks are useful since they can be re-observed from different positions and different angles as a robot changes position. For illustration purposes, markers will be used as the primary landmarks discussed herein, but other types of landmarks are also possible within examples.

Although a manual survey of an environment may enable the creation of an accurate map of the markers that a robot can use, this process is time consuming and can delay the deployment of robots. The method may also require subsequent tests to identify particular areas that prove difficult to navigate without adding more markers.

In order to speed up the mapping process and enable real-time user feedback, a computing system may perform a simultaneous localization and mapping (SLAM) process to build a map of an unknown environment (e.g., a warehouse) using measurements provided by a sensor coupled to a robot while the robot also navigates the environment using the map. SLAM may involve marker detection, data association, pose estimation, and pose/marker refinement, and can be performed in either two-dimensions (2D) or three-dimensions (3D) using a variety of sensor data, such as laser scans of the environment. While performing SLAM, the computing system may develop a map that specifies positions of detected markers that can be used by the robot and other devices deployed in the environment.

The performance of SLAM to localize a robot within an environment is often performed relative to the position of a sensor on the robot. As a result, SLAM may produce sequences of sensor poses and a map of detected markers relative to the position and orientation of the sensor in the environment, not the robot. To account for differences between the sensor poses as indicated by SLAM and the poses of the robot within the environment, a fixed sensor-to-robot transform may be used to localize the robot in the map if needed. For instance, the fixed sensor-to-robot transform may be used for navigating the robot within the environment.

In some instances, the fixed sensor-to-robot transform may produce errors that impact localization of the robot within an environment. For instance, the position of the sensor on the robot can change over time causing an increase in the difference between robot poses determined using the fixed sensor-to-robot transform and the actual poses of a robot within the environment. In other examples, a fixed sensor-to-robot transform may be consistently inaccurate by the same amount due to a mounting error of the sensor on the robot. The above situations as well as others may yield errors that reduce the ability for the robot to navigate the environment accurately.

Example implementations for localization and calibration may help reduce errors that can arise from reliance upon a fixed sensor-to-robot transform. Particularly, rather than relying upon a fixed sensor-to-robot transform when localizing a robot within an environment, a computing system may determine a pose of the sensor (sensor pose) relative to the robot to reduce potential errors. For instance, the computing system may determine a sensor pose that optimizes a cost function such that the sensor pose produces minimal error. The computing system may also determine and use the sensor pose to identify when the sensor pose differs from prior expectations. This enables the computing system to account for an identified difference in the sensor pose when determining robot poses within the environment.

In some examples, when optimizing a cost function to determine the sensor pose, the cost function may relate detections of the same marker at different robot poses. For instance, a computing system may receive sensor data that indicates positions of markers within the environment. The sensor data received at the computing system may be from a sensor coupled to a robot when the robot is located at various poses within the environment. As such, the sensor data may capture markers positioned within the environment from different angles as the robot changes position and orientation.

The computing system may use incoming sensor data and the various robot poses to determine a pose graph that represents the robot poses and the detected markers. In particular, the pose graph may include a number of edges associated with a cost function representing a distance measurement between one or more matching marker detections at different robot poses. The distance measurement may incorporate the different robot poses and a sensor pose on the robot. The computing system may determine a sensor pose transform that represents the sensor pose on the robot which optimizes the cost function associate with the edges in the pose graph, and also provide the sensor pose transform representing the sensor pose on the robot. For instance, the computing system may provide the sensor pose transform to the robot control system for use during navigation.

In further examples, a cost function may relate detections of one or more markers to mapped positions of the markers when a prior map is available. For instance, the computing system may determine a sensor pose transform to optimize the cost function associated with edges in the pose graph that represent a distance between a marker detection and a previously mapped position of the marker. Such edges may be included in the pose graph in addition to or instead of the edges relating distances between matching marker detections at different robot poses. When a prior map of markers is available, a robot may be controlled to make a series of movements relative to the mapped markers as part of a calibration process to determine the sensor pose.

In some examples, the computing system may simultaneously determine the sensor pose transform and the various robot poses relative to the map of markers in order to optimize the cost function associated with the edges in the pose graph. For instance, the computing system may determine the sensor pose transform as the robot navigates within the environment incorporating both new measurements and new robot poses when determining the sensor pose transform. The new measurements and robot poses may also be used to adjust the sensor pose transform. Accordingly, the sensor pose transform may be continuously or periodically updated using new information to minimize potential errors.

In further examples, the computing system may determine the sensor pose transform subsequent to determining robot poses within the environment. For instance, the sensor pose transform may be determined when the robot is offline (i.e., during a non-operation period). When determining the sensor pose transform after determining robot poses within the environment, the computing system may hold the robot poses as fixed while determining the sensor pose transform.

In some examples, a computing system may perform multiple iterations of SLAM to verify the accuracy of a determined sensor pose transform. In some cases, the computing system may determine that the sensor pose transform requires modification. As an example, after determining an initial pose graph, the computing system may determine an additional pose graph representing subsequent robot poses and detect markers. The additional pose graph may be based on sensor data subsequently received when the robot is located at the subsequent robot poses. The computing system may then determine a second sensor pose transform based on the additional pose graph and use the second sensor pose transform to check the accuracy of the initial sensor pose transform. The computing system may repeat this process to validate a previously determined sensor pose.

In some instances, the second sensor pose transform may validate and confirm that the initial sensor pose transform does not require modification. Particularly, a match between a previously determined sensor pose transform and the subsequently determined sensor pose transform may serve as confirmation that the prior sensor pose transform is accurate. In other instances, however, a subsequent pose transform may differ from a prior sensor pose transform. If this is the case, the computing system may identify a difference between the initial sensor pose transform and the subsequent sensor pose transform and provide a calibration error signal that specifies the identified difference between the initial sensor pose transform and the subsequent pose transform. The computing system may repeat this process using additionally determined sensor pose transforms to further calibrate prior sensor pose transforms.

In additional examples, a computing system may use a pose graph to determine the sensor pose of multiple sensors positions on the robot. For instance, the computing system may determine a sensor pose for a first laser scanner and a second sensor pose for a camera positioned on the robot. The sensors may be the same or different types.

When determining additional sensor poses, the computing system use additional sensor data from other sensors to determine the sensor poses for those sensors. For instance, the computing may receive sensor data indicative of markers from a second sensor on the robot when the robot is located at the various robot poses within the environment as specified in the pose graph. The computing system may modify the pose graph to include additional edges based on the sensor data from the second sensor and a sensor pose of the second sensor on the robot. As a result, the computing system may use the pose graph to determine a second sensor pose transform representing the pose of the second sensor on the robot. The computing system may also provide the sensor pose transform for the second sensor to the robot control system or other computing systems. In a further example, the computing system may repeat the above process for additional sensors positioned on a robot.

In some examples, a pose graph may be also used to optimize one or more motion model parameters of a vehicle. Motion model parameters may be optimized in addition to or instead of sensor calibration. A computing system may use edges in the pose graph that relate only to the robot pose and not rely upon detected markers when determining motion model parameters. Particularly, the computing system may compare consecutive robot poses to predicted motions of the robot based on motion model parameters. If the motion model parameters are inaccurate, the estimated vehicle motion may systematically deviate from actual vehicle motion. For instance, the computing system may analyze wheel odometry, time between scans, control instructions, and/or other factors when determining the robot motions. The computing system may determine the pose graph to include additional edges associated with an additional cost function representing an error in consecutive robot poses based on a robot motion model.

The computing system may then determine one or more motion model parameters for the robot that optimize the additional cost function associated with the additional edges in the pose graph. For example, motion model parameters may include a turning delay, a wheel diameter, a turning radius, and a center point of rotation. In some instances, the computing system may hold the edges in the pose graph and the sensor pose transform fixed when determining the one or more motion model parameters. The motion model parameter(s) for the robot may be provided to the robot control system or other computing systems.

Sensor pose calibration and motion model calibration may be run separately or together (e.g., alternating sensor pose calibration and motion model calibration). In further examples, the computing system may update one or more of the robot poses in the pose graph based on the one or more motion model parameters. The computing system may also subsequently adjust the sensor pose transform after updating one or more robot poses in the pose graph.

II. SYSTEM DESIGN FOR ROBOTIC DEVICES

FIG. 1 is a block diagram of system 100, in accordance with an example embodiment. System 100 includes planning system 110 and robotic device 120. Planning system 110 can include offboard planner 112 that can coordinate motions of one or more robotic devices operating in an environment. Offboard planner 112 may include roadmap planner 114 such that offboard planner 112 and/or roadmap planner 114 may generate one or more asynchronous paths 116 for a robotic device (e.g., robotic device 120) to follow in an environment.

A roadmap graph, prototype graph, or other roadmap representative of an environment, such as prototype graph 300 discussed below in the context of FIG. 3, can be received, determined, or otherwise provided to planning system 110, offboard planner 112 and/or roadmap planner 114. Asynchronous paths 116 can be one or more paths developed based on one or more of the roadmap graph, prototype graph, or other roadmap. For example, if the roadmap graph, prototype graph, or other roadmap has a plurality of edges that connect a plurality of intersections, asynchronous paths 116 can be specified in terms of the plurality of edges and/or the plurality of intersections.

In some examples, robotic device 120 can be any one or more steered vehicle(s) capable of following a path. For example, robotic device 120 can include onboard software 130 and/or hardware 150. Onboard software 130 can include one or more of: localization subsystem 132, obstacle detection subsystem 134, odometry subsystem 136, path-following subsystem 138, and trajectory-following subsystem 142. As such, onboard software 130 may include additional software systems in other examples.

Localization subsystem 132 represents a system capable of localizing a robotic device. In other words, localization subsystem 132 may enable location determination of the robotic device with respect to an environment. For instance, localization subsystem 132 can generate position estimates of the robotic device and/or other objects that can be used to localize the robotic device and assist the robotic device in following a desired path (e.g., asynchronous paths 116), and/or assist the robotic device in following a trajectory (e.g., trajectories 140). Once the position estimates are generated, localization subsystem 132 can provide the position estimates to path-following subsystem 138.

An asynchronous path, or path for short, can be a time-invariant plan or other information indicating how robotic device 120 may travel from a starting point (SP) to an ending point (EP); i.e., an (asynchronous) path does not take time into account. In contrast, a trajectory can include values of a steering angle and of traction motor velocity that robotic device 120 can follow for a planning time interval.

The planning time interval can be a duration of time during which a robotic device is guided, or planned, to follow a path, route, and/or travel. In some embodiments, the planning time interval can be a predetermined amount of time; e.g., five seconds, one second, 0.2 seconds, 0.1 seconds. In particular, a predetermined planning time interval can be determined based on a user input that specifies a value for the planning time interval. In other embodiments, the planning time interval can be determined based on one or more other values; e.g., a stitch time, a time associated with a uniform edge (or path) cost, an estimated time to travel along a trajectory. Other techniques for determining the planning time interval and values for the planning time interval are possible as well.

Then, one or more trajectories can be used to describe how robotic device 120 can travel from starting point (SP) to an ending point (EP) in a time-variant manner. In some embodiments, a trajectory can also provide information about values of other variables than a steering angle and a traction motor velocity over the planning time interval, such as, but not limited to, other kinematic variables (e.g., velocity and acceleration) of robotic device 120, and actuator positions of robotic device 120.

As an example, a path to drive a car from a location "home" to a location "work" may include an ordered listing of streets that a control entity, such as a person or control device of an autonomous vehicle, can use to drive the car from home to work. In this example, a trajectory from home to work can involve one or more instructions specifying velocity and/or acceleration that the control entity can use to drive the car from home to work. In some examples, the trajectory can take traffic, obstacles, weather, and other time-sensitive conditions into account; e.g., the trajectory to go from home to work can indicate that the control entity "turn right for 10 seconds at 20 MPH or less", "accelerate to 55 MPH and drive straight for 3 minutes", "slow to 20 MPH within 30 seconds", "turn left for 10 seconds at 20 MPH or less", etc. In some embodiments, the trajectory can be changed along the way; e.g., to account for obstacles, changes in path, etc.

Obstacle detection subsystem 134 can determine whether one or more obstacles are blocking a path and/or a trajectory of robotic device 120. Examples of these obstacles can include, but are not limited to, pallets, objects that may have fallen off a pallet, robotic devices, and human operators working in the environment. If an obstacle is detected, obstacle detection subsystem 134 can provide one or more communications indicating obstacle detection to path-following subsystem 138. The one or more communications indicating obstacle detection can include location information about one or more positions of one or more obstacles detected by obstacle detection subsystem 134 and/or identification information about the one or more obstacles detected by obstacle detection subsystem 134. Odometry subsystem 136 can use data, such as data from servo drives 152, to estimate one or more changes in position of robotic device 120 over time.

Path-following subsystem 138 and/or trajectory-following subsystem 142 can act as a planner aboard robotic device 120. This onboard planner can follow one or more paths, such as asynchronous paths 116, based on position estimates provided by localization subsystem 132.

Path-following subsystem 138 can receive asynchronous paths 116, position estimate inputs from localization subsystem 132, location information about one or more positions of one or more obstacles from obstacle detection subsystem 134, and/or information about one or more changes in position from odometry subsystem 136, and generate one or more trajectories 140 as outputs.

Hardware 150 can include servo drives 152 and/or motors 154. Servo drives 152 can include one or more servomechanisms and related electrical equipment. In some examples, servo drives 152 can include one or more electronic amplifiers used to power the one or more servomechanisms and/or to monitor feedback signals from the servomechanism(s). Servo drives 152 can receive control signals, such as trajectories 144, from onboard software 130, and can provide electric current to the servomechanism(s) to produce motion proportional to the control signals. In some embodiments, servo drives 152 can compare status information received from the servomechanism(s) with an expected status as commanded by trajectories 144. Then, servo drives 152 can adjust a voltage frequency or pulse width of the provided electric current to correct for deviations between received status information and an expected status. In other embodiments, servo drives 152 can provide information, such as the feedback signals and/or location-related information, to onboard software 130.

One or more motors 154 can be part or all of the servomechanism(s) of servo drives 152. For example, motors 154 can use the electric current provided by servo drives 152 to generate mechanical force to drive part or all of robotic device 120; e.g., motors 154 can provide force to propel robotic device 120 and/or drive one or more effectors of robotic device 120.

Path planning of robotic devices within an environment, such as an environment that includes indoor settings, such as a warehouse, office building, or home, and/or outdoor settings, such as a park, parking lot, or yard, can be performed with respect to a roadmap graph, which is a connected graph of paths that agents, such as robotic devices, may follow. Using roadmap graphs to plan agent routing within the environment rather than taking a free-space approach can reduce a total planning state space and so making large-scale multi agent coordination tractable. Further, the use of roadmap graphs can enable operators to intuitively control areas in which robotic devices are allowed to navigate.

Roadmap graph generation can first involve generation of a prototype graph, which indicates the rough position of lanes and directions of travel. In some examples, a prototype graph can be a directed graph that indicates lanes and directions of travel of robotic devices. In other examples, a prototype graph can be generated manually based on a map or drawing of the environment.

Figure 2:
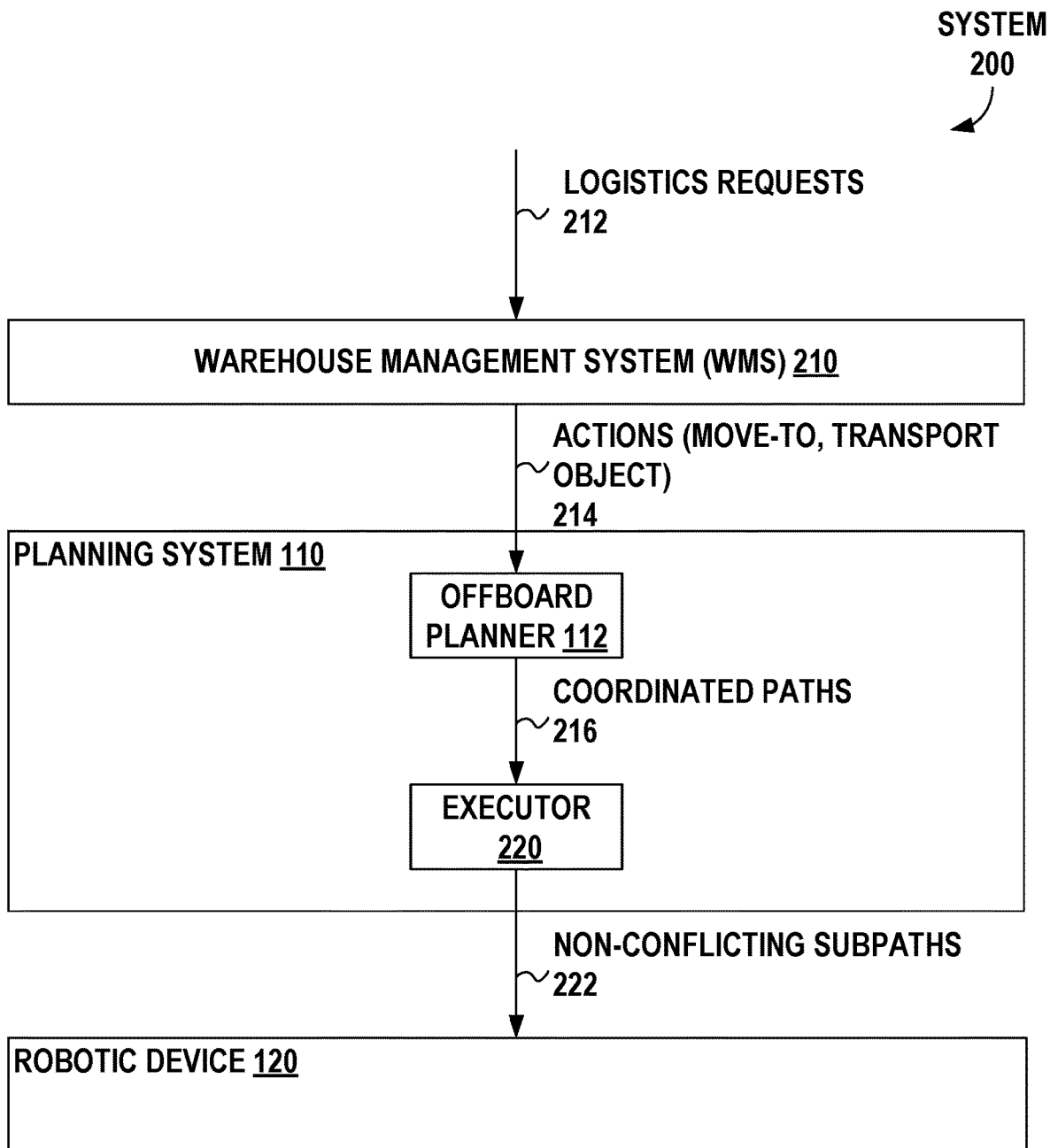
FIG. 2 depicts a system for operating one or more warehouses, in accordance with an example embodiment.

FIG. 2 depicts system 200 for operating one or more warehouses, in accordance with an example embodiment. System 200 includes warehouse management system 210, planning system 110, and robotic device 220. Warehouse management system 210 can receive one or more logistics requests 212 associated with the warehouse; e.g., requests to store one or more items in the warehouse and/or requests to ship one or more items from the warehouse. Warehouse management system 210 can translate logistics requests 212 into one or more actions 214, where actions 214 can include, but are not limited to, a "move-to" action to move one or more designated agents to one or more designated locations, and a "transport" action to carry one or more items to one or more designated locations. In some examples, actions 214 can include go-to commands of the form {agent ID, destination}, but other actions are possible such as "move pallet". These are typically decomposable into move-to commands, however (move to pick location, move to place location).

Planning system 110 includes offboard planner 112 and executor 220. Offboard planner 112 can receive actions 214 as inputs and generate one or more coordinated paths 216 for one or more agents operating in a warehouse; e.g., multiple robotic devices, to carry out actions 214. Coordinated paths 216 can be part of a coordinated action plan for all agents in the warehouse to fulfill logistics requests 212. The coordinated action plan can take precedence of agents into account; e.g., if robotic devices RD1 and RD2 are both expected to reach a point at approximately the same time, one of the robotic devices can have precedence or priority over the other, such as robotic device RD1 waiting for robotic device RD2 to pass through the point (or vice versa). Executor 220 can receive coordinated paths 216 and generate non-conflicting sub-paths 222 to direct robotic device 120 in accomplishing its part of the coordinated action plan to carry out actions 214 to fulfill logistics requests 212.

As illustrated above in FIG. 2, planning system 110, which includes offboard planner 112 and executor 220, can communicate with robotic device 120. In some embodiments, the robotic device can be a fork truck; for example, any Occupational Safety and Health Administration (OSHA) Class 1 or Class 3 powered industrial truck. In other embodiments, planning system 110 can includes software that executes using one or more networked computing devices located in the "cloud" (e.g., one or more networked computing devices) and/or located somewhere on a premises co-located with robotic device 120.

Figure 3:
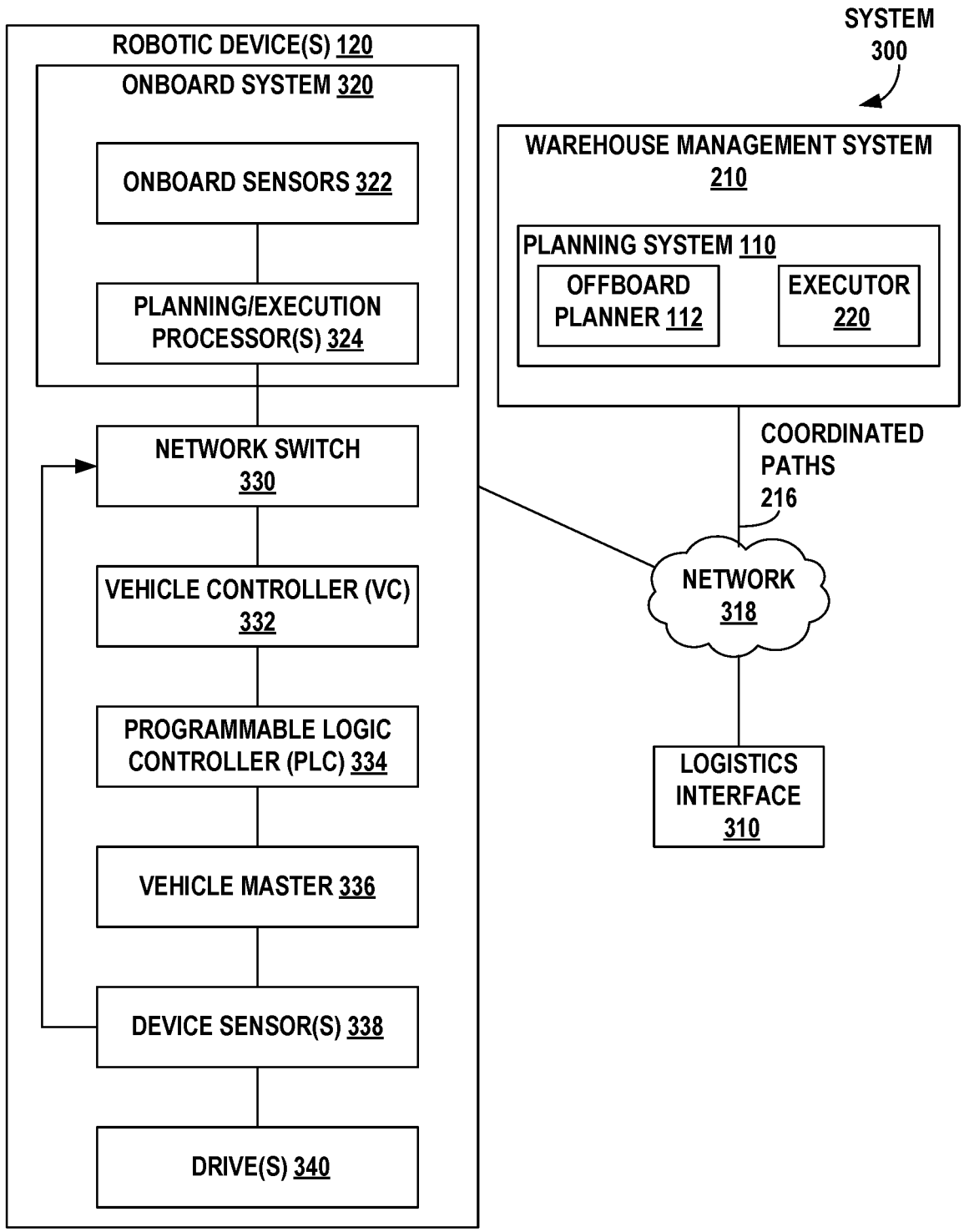
FIG. 3 illustrates a system, in accordance with an example embodiment.

FIG. 3 illustrates a system 300 that includes logistics interface 310, warehouse management system 210, and one or more robotic devices 120 connected using network 318, in accordance with an example embodiment. Logistics interface 310 can provide inventory task instructions to warehouse management system 210 via network 318 regarding movement of objects, such as pallets, and/or robotic devices to warehouse management system 210. An example inventory task can be to move pallet A containing items of type B to location C.

Warehouse management system 210 can receive the inventory task instructions from logistics interface 310 and generate one or more task/mission instructions (e.g., an instruction to robotic device A to move pallet B from location C to location D) and/or plans for controlling robotic device(s) 120 to carry out the inventory task instructions. The task/mission instructions and/or plans can include information about one or more paths and/or one or more trajectories, where the task/mission instruction(s), plan(s), path(s) and trajectory/trajectories are generated by planning system 110 of warehouse management system 210 using the techniques discussed in the context of FIGS. 1 and 2.

For example, warehouse management system 210 can be a centralized control service running on and storing data using one or more computing devices; e.g., server computing devices. To perform these tasks, warehouse management system 210 can include WMS middleware and can provide a user interface to provide access to tools for monitoring and managing system 300. The WMS middleware and/or other components of warehouse management system 210 can use one or more application programming interfaces (APIs), such as protocol conversion APIs for conversion between task/mission instructions (e.g., an instruction to robotic device A to move pallet B from location C to location D) to robotic device paths, poses, and/or trajectories; conversion between inventory tasks and task/mission instructions; and conversions between APIs.

The user interface provided by warehouse management system 210 can provide one or more user interface functions for system 300, including, but not limited to: monitoring of robotic device(s) 120, e.g, presenting data related to location, battery status, state of charge, etc. of one or more robotic devices; enabling generation and sending of inventory task instruction(s), task/mission instruction(s), plan(s), path(s) and/or trajectory/trajectories to one or more of robotic device(s) 120; and reviewing, updating, deletion, and/or insertion of data related to one or more warehouse maps, pallets, networks, and/or planning systems (e.g., planning system 110, warehouse management system 210, and/or logistics interface 310).

In some embodiments, warehouse management system 210 can route communications between logistics interface 310 and robotic device(s) 120 and between two or more of robotic device(s) 120 and manage one or more onboard systems, such as onboard system 320 aboard one or more of robotic device(s) 120. In other embodiments, warehouse management system 210 can store, generate, read, write, update, and/or delete data related to system 300, such as, but not limited to: data regarding completion of a task/mission instruction by one or more of robotic device(s) 120; data regarding locations and/or poses of some or all of robotic device(s) 120, including data indicating a location where a robotic device was initialized/booted; data related to one or more audit trails for human actions, incident analysis, and/or debugging; and data for state tracking. In other embodiments, warehouse management system 210 can include a central message router/persistence manager that communicates with robotic device(s) 120 and one or more adapters. Each of the one or more adapters can provide access to data and/or communications of system 300 available to warehouse management system 210, and can include, but are not limited, to: a user interface service adapter for the above-mentioned user interface, a web content service adapter enabling World Wide Web (WWW)/Internet access to information about system 300, a message proxy adapter and/or a WMS adapter to act as intermediaries between communications between APIs and/or the WMS.

FIG. 3 shows that each of the one or more robotic devices 120 can include one or more of: onboard system 320, network switch 330, vehicle controller 332, programmable logic controller (PLC) 334, one or more device sensors 338, and one or more drives 340.

Onboard system 320 can be a computation and sensor package for robotic planning configured for installation into and use with robotic device 120, where onboard system 320 can include onboard sensors 322 and one or more planning/execution processors 324. FIG. 3 also shows that onboard system 320 that is configured to use network switch 330 at least to communicate with planning system 110 (via network 318), with device sensors 338, and/or with one or more actuators of robotic device 120.

Onboard system 320 can be responsible for one or more of: localization of robotic device 120, generation of local trajectories to carry out plans and/or travel along paths and/or trajectories provided by warehouse management system 210, generation of commands to drives 340 to follow one or more (local) trajectories, generation of commands to control actuator(s) of robotic device 120, and reporting pose, status and/or other information to warehouse management system 210.

Onboard sensors 322 can include one or more navigation lasers, laser scanners, cameras, and/or other sensors for navigating and/or controlling onboard system 320. For example, a robotic device of robotic device(s) 120 can include one or more laser scanners (e.g., laser scanner in FIG. 5), such as one or more laser scanners provided by SICK AG of Waldkirch, Germany, HOKUYO AUTOMATIC CO. LTD of Osaka, Japan, and/or KEYENCE CORPORATION of Osaka, Japan. The laser scanners can be used for obstacle detection and/or avoidance along a direction of travel of the robotic device as well as along the sides, corners, and/or back of the robotic device. The laser scanners can also be used to localize the robotic device using reflector-based localization. In some embodiments, cameras and/or other sensors can be used for obstacle detection, obstacle avoidance, and/or localization instead of or along with the laser scanners.

Planning/execution processor(s) 324 can include one or more computer processors connected at least to onboard sensors 322. Planning/execution processor(s) 324 can read data from onboard sensors 322, generate local trajectories and/or commands to drive(s) 340 to move robotic device 120, and communicate with warehouse management system 210. A local trajectory can be a trajectory where robotic device 120 starts at a starting pose and reaches an ending pose at some time. In some examples, the starting pose can be implicitly specified; e.g., the starting pose can be a current pose of robotic device 120 and so the local trajectory be based on an assumption that its starting pose is the current pose of robotic device 120.

Planning/execution processor(s) 324 can utilize a component framework. The component framework can be a multi-threaded job scheduling and message passing system built on software libraries for input/output (I/O) and signaling configured to provide a consistent asynchronous model of robotic device 120, such as the "boost::asio" and "boost::signals2" software libraries provided by boost.org of Onancock, Va. The component framework can enable communication between software components (or modules) so that the software components can be executed in parallel in a thread safe manner.

The component framework can include one or more of: a state machine component, a localization component, a planning component, and a trajectory following component. The state machine component can manage a state of robotic device 120 for vehicle initialization, vehicle commanding and fault handling. The state machine component can use a deterministic finite automaton or other state machine to manage the state of the robotic device.

The localization component can read data from vehicle sensors and integrate prior state information of robotic device 120 to determine a pose of robotic device 120. The vehicle sensor data may be indicative of one or more landmarks/points of interest detected by the vehicle sensors. Alternatively, the data from the vehicle sensors may require processing such that the localization component detects the one or more landmarks/points of interest based on the vehicle sensor data. The pose can be determined relative to the one or more detected landmarks/points of interest, such as pallets or other objects. The planning component can receive one or more objectives from warehouse management system 210 and determine a local trajectory for robotic device 120 to achieve those objectives. In some embodiments, the local trajectory can be a short-term trajectory that robotic device 120 is to follow for a predetermined amount of time; e.g., 100 milliseconds, 200 milliseconds, 500 milliseconds, 1 second, 5 seconds. The trajectory following component can receive the local trajectory generated by the planning component, and generate drive control instructions to travel along the local trajectory. The drive control instructions that are then relayed to drives 340 that control a traction motor and other actuators for robotic device 120.

Network switch 330 can enable communications for robotic device(s) 120. These communications can include, but are not limited to, communications between onboard system 320 and the rest of robotic device 120; e.g, device sensors 338 and drives 340, and communications with warehouse management system 210 via network 318. For example, network switch 330 can enable Transmission Control Protocol/Internet Protocol (TCP/IP)-based communications over Ethernet and/or other wireline communications interface(s) to a wireline network and/or over Wi-Fi™ and/or other wireless communications interface(s) to a wireless network, such as a PLANET Ethernet Switch by PLANET Technology Corporation of New Taipei City, Taiwan.

In some embodiments, communications between robotic device(s) 120 and planning system 110 can include remote procedure calls (RPCs). The remote procedure calls can allow invocation of software procedures, methods, and/or functions resident on one or more of robotic device(s) 120 by software of planning system 110 and vice versa. The remote procedure calls can be based on a communications protocol, such as TCP/IP, a HyperText Transfer Protocol (HTTP) such as HTTP 1.0 and/or HTTP 2.0, and/or another communications protocol. Some or all of the remote procedure calls can include encrypted data; such data may be encrypted using the Secure Sockets Layer (SSL), Transport Layer Security (TLS), and/or one or more other encryption algorithms and/or protocols. In embodiments where encrypted data is used, one or more certification authorities, such as a private certification authority, can authenticate one or more certificates used in encrypting and/or decrypting the encrypted data. A certificate authority can use an access control list (ACL) to control access to the one or more certificates. The remote procedure calls can use a request/response protocol and/or a bidirectional streaming protocol for RPC-related communications. In embodiments where the bidirectional streaming protocol is used for RPC-related communications, a single long-lived RPC can be used to implement the bidirectional streaming protocol.

Vehicle controller 332 and/or programmable logic controller 334 can provide electrical and sensor management functionality for robotic device(s) 120. The electrical and sensor management functionality can include, but is not limited to, functionality for electrical load control, lighting control, sensor control, sensor and/or switch signal processing, and power management. Vehicle master 336 can provide functionality for controlling one or more actuators, such as lift devices, of robotic device(s) 320.

Device sensor(s) 338 can include one or more sensors that can provide data related to controlling and/or operating robotic device(s) 120. The data can provide information about an environment about robotic device(s) 120, such as but not limited to, localization information, position estimates, and mapping data. For example, device sensor(s) 338 can include one or more lasers (e.g., two-dimensional (2D) lasers, safety lasers, laser scanners), cameras (e.g., Time-of-Flight (ToF) cameras, Red-Green-Blue (RGB) cameras, thermal cameras), electrical sensors, proximity sensors, navigational devices, and location sensors.

Drive(s) 340 can include one or more drive controllers and/or actuators that provide functionality for moving robotic device(s) 120. The drive controllers can direct the drive actuators to control movement of robotic device(s) 120. The drive actuators can include one or more traction motors, electric drives, hydraulic drives, and pneumatic drives.

Figure 4:
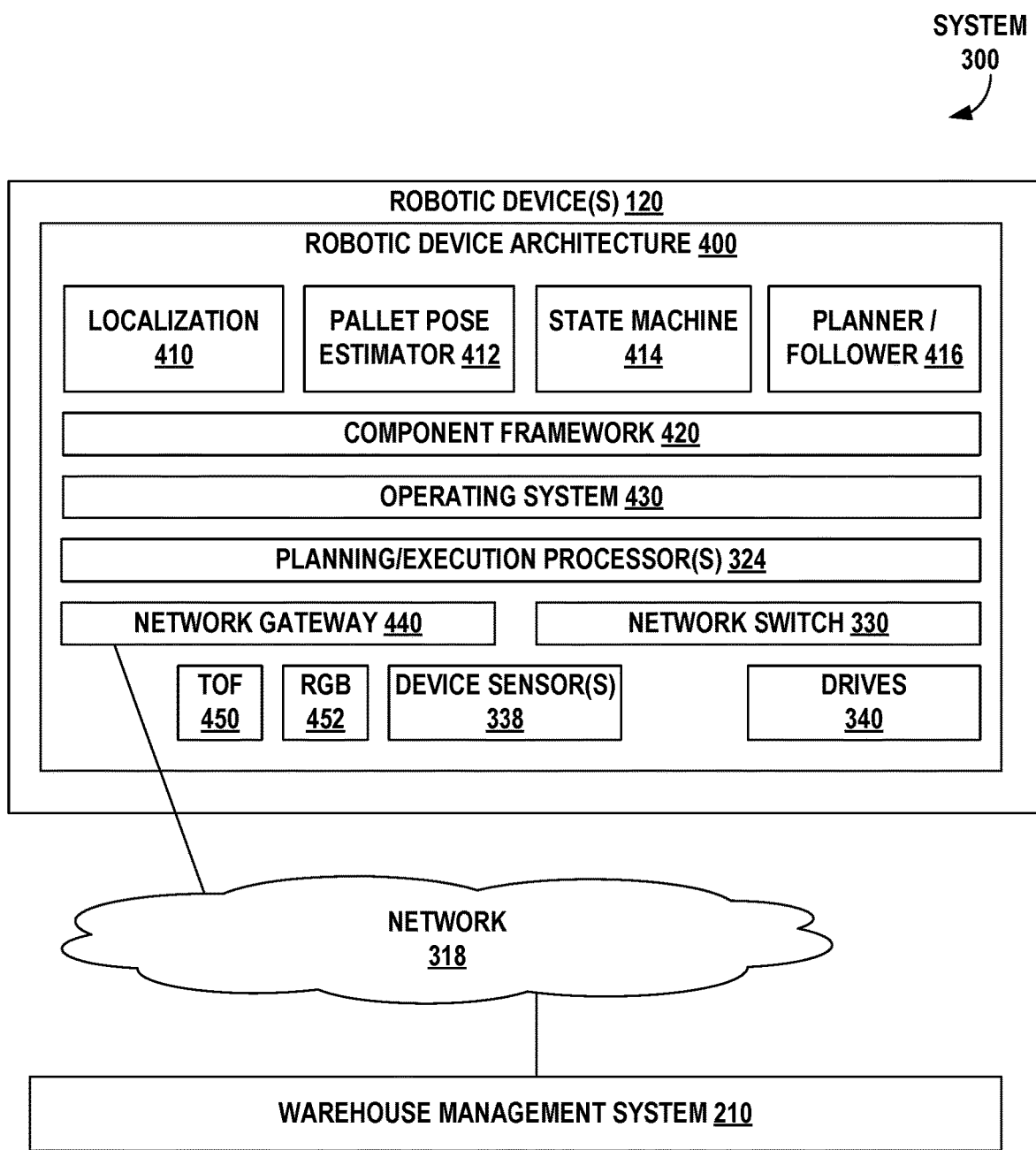
FIG. 4 illustrates robotic device architecture for one or more robotic devices, in accordance with an example embodiment.

FIG. 4 illustrates robotic device architecture 400 of robotic device(s) 120, in accordance with an example embodiment. Robotic device architecture 400 of robotic device(s) 120 can include software. The software can include software for localization 410, software for a pallet pose estimator 412, software related to state machine 414, software for planner follower 416, software for component framework 420 and software for operating system 430. The software can be executed by one or more hardware planning/execution processors 324. Communications between robotic device(s) 120 and other devices can be carried out using network gateway 440 and/or network switch 330. For example, network gateway 440 can be used for wireless communications with and within a robotic device of robotic device(s) 120 and network switch 330 can be used for wireline communications with and within a robotic device of robotic device(s) 120. Robotic device architecture 400 also includes additional hardware such as device sensor(s) 338 and drive(s) 340 discussed above in the context of FIG. 3. In some embodiments, robotic device architecture 400 can include one or more cameras, including but not limited to, ToF camera 450 and RGB camera 452, where the one or more cameras can include one or more still cameras and/or one or more video cameras.

Figure 5:
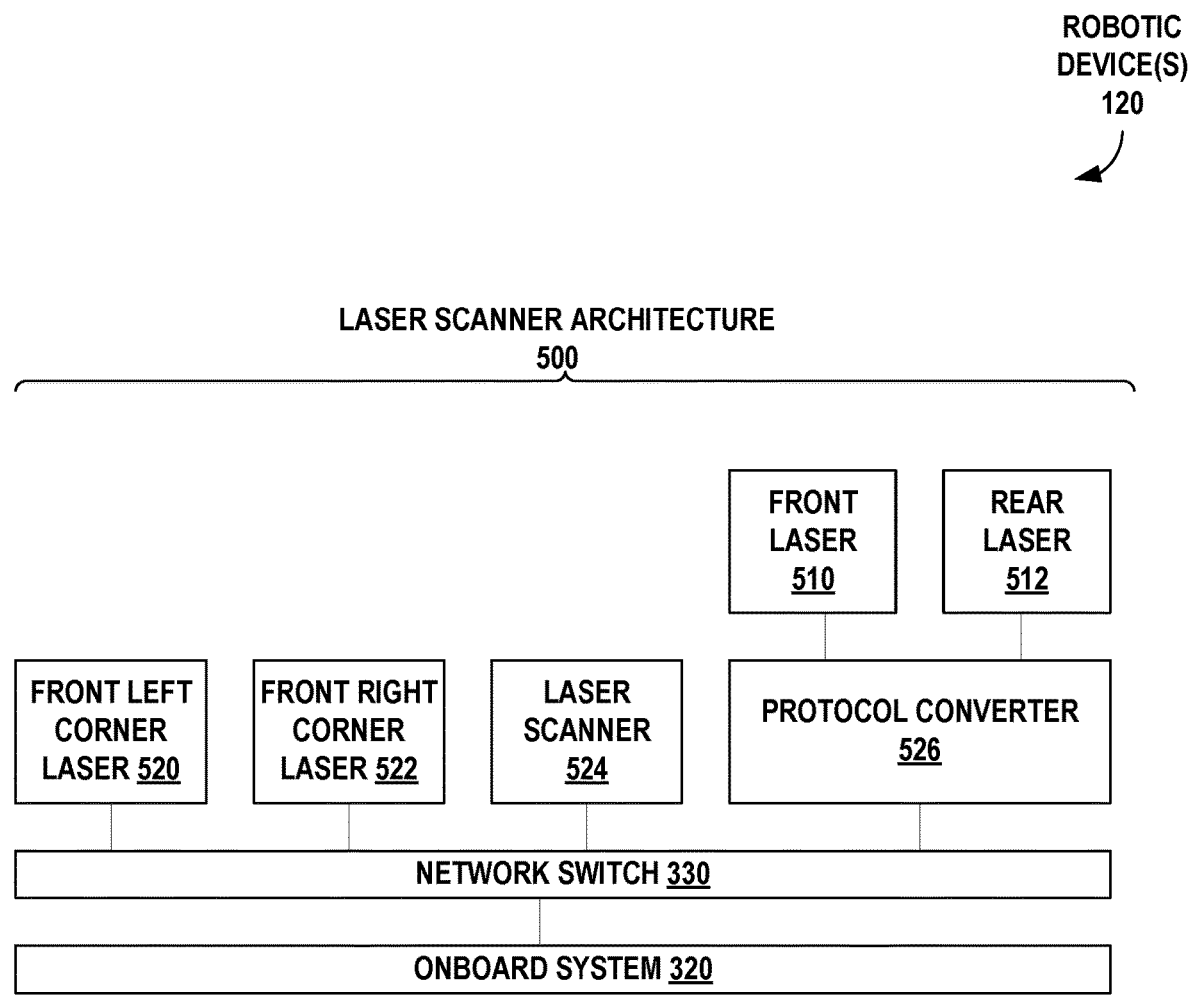
FIG. 5 illustrates laser scanner architecture for one or more robotic devices, in accordance with an example embodiment.

FIG. 5 illustrates laser scanner architecture 500 for robotic device(s) 120, in accordance with an example embodiment. In some embodiments, some or all of device sensor(s) 338 can be lasers and laser scanners illustrated by laser scanner architecture 500.

Laser scanner architecture 500 can include lasers 510, 512, 520, 522, laser scanner 524, protocol converter 526, network switch 330, and onboard system 320. Lasers 510, 512, 520, and 522 can be located at fixed positions of robotic device(s) 120; for example, laser 510 can be located at the front of a robotic device, laser 512 can be located at the rear of the robotic device, laser 520 can be located at a front left corner of the robotic device, and laser 522 can be located at a front right corner of the robotic device. Lasers 510, 512, 520, 522, and/or laser scanner 524 can provide information to localize the robotic device within an environment. In some embodiments, lasers 510, 512, 520, 522, and/or laser scanner 524 can emit light that is reflected off of one or more reflectors—the reflected light can be detected by one or more laser sensors, and the robotic device can be localized within the environment based on a duration of time taken to detect the reflected light. In particular of these embodiments, some or all of lasers 510, 512, 520, 522, and/or laser scanner 524 can include one or more laser sensors for detecting reflected laser light. Then, some or all of lasers 510, 512, 520, 522, and/or laser scanner 524 can generate data, including but not limited to, data related to a laser (e.g., maintenance data for the laser), data related to light emitted by the laser, and data related to one or more durations of time taken to detect reflected laser light by the laser sensor(s).

As illustrated in FIG. 5, some lasers, such as lasers 520, 522, and laser scanner 524 can be directly connected to network switch 330, while other lasers, such as lasers 510, 512, can be connected to network switch 330 via protocol converter 526. Protocol converter 526 can convert a communications protocol used by a laser, such as laser 510 and/or 512, to a communications protocol used by network switch 330; e.g., convert from a communications protocol based on RS-422 to a communications protocol based on Ethernet. Then, lasers 510, 512, 520, 522, and laser scanner 524 can send data to and receive commands from onboard system 320 via network switch 330 and perhaps protocol converter 526.

In some embodiments, robotic device(s) 120 can be subject to one or more failure conditions. Examples of those failure conditions and related recovery strategies are described in Table 1 below.

TABLE 1

| Name | Summary | Recovery Strategy |
|---|---|---|
| Stale Localization | Localization system is unable to determine robotic device pose and/or localization certainty estimate has exceeded bounds. | Robotic device will halt and notify human operator. The operator can intervene by manually driving robotic device to a location for re-localization and reengaging. |
| Trajectory Following | Trajectory following error exceeds threshold. | Robotic device will halt and attempt to restart trajectory following automatically. If system fails twice in a row then human operator will be notified. The operator can intervene by manually driving robotic device back onto roadmap. |
| No Safe Trajectory | Due to obstacle proximity, the trajectory planner cannot find a safe trajectory that would keep the robotic device a safe distance from known obstacles. | Robotic device will halt and notify human operator. The operator can intervene by manually driving robotic device around obstacle. |
| Hardware Fault | Steering/traction drive fault or other low-level hardware I/O fault condition | Robotic device will halt and notify human operator. The operator can power-cycle and manually drive robotic device back onto roadmap. |
| Pallet Detection Failure | Robotic device expected to discover a pallet at commanded location; no pallet was found | Robotic device will send message to a control service that includes sensor data relative to where the pallet was expected to be discovered. The control service will notify human operator and optionally may send pallet pose information manually. |
| Pallet Pose Estimation Failure | Robotic device could not determine pose of pallet relative to robotic device at high confidence. | Robotic device will send message to a control service that includes sensor data relative to where the pallet was expected. The control service will notify human operator and send pallet pose information manually. |

III. EXAMPLE PRE-MAPPING AN ENVIRONMENT

Figure 6:
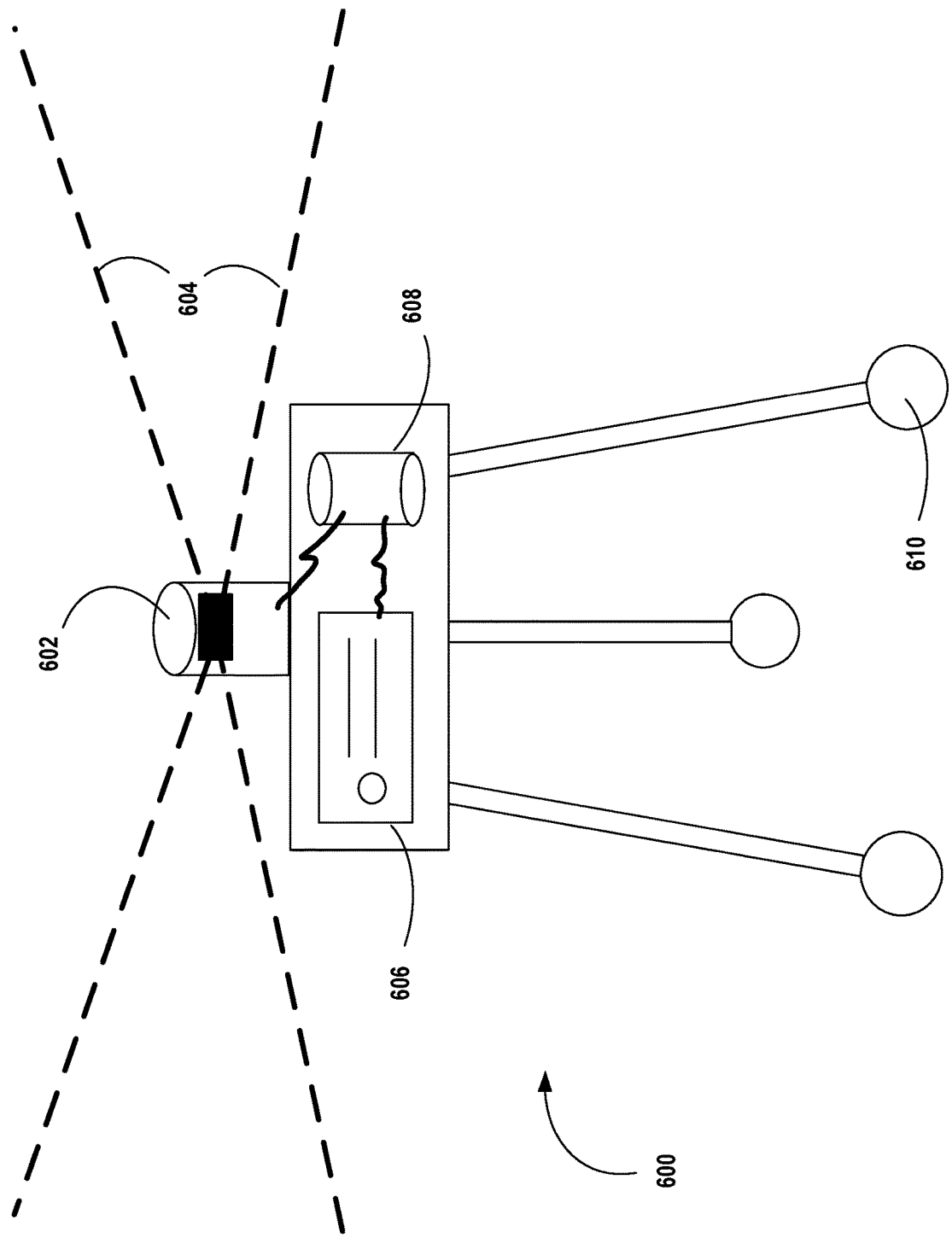
FIG. 6 shows a device for pre-mapping a space, according to an example embodiment.

FIG. 6 shows an example device for pre-mapping a space, according to an example embodiment. More specifically, the device includes a sensor 602 configured to collect sensor data representative of an environment in which one or more robots may later be deployed. In some examples, the sensor 602 may be a two-dimensional navigation laser sensor capable of producing distance measurements to surfaces in the environment, as well as locations of detected markers. In particular, the sensor 602 may project laser light beams 604 and measure reflected beams to measure distance. The sensor 602 may be mounted at a same height as a sensor on a robot to be deployed within a space in order to replicate detection capability of the robot. For instance, the sensor 602 may be positioned at a height to detect retroreflective reflectors arranged in a horizontal plane within an environment. In other examples, the sensor 602 may be a two-dimensional laser scanner that only produces distance or contour measurements. In further examples, the sensor 602 may be another type of sensor, such as a stereo camera.

The device additionally includes a computing unit 606 that processes the sensor data from sensor 602. In particular, computing unit 606 may be configured to run any of the types of mapping functionality described herein to generate maps of the space and/or use generated maps. The device additionally includes a battery pack 608 for powering both the sensor 602 and the computing unit 606. The device further includes a mobile base 610 that allows the device to be easily moved through a space in advance of deploying one or more robots. For instance, the mobile base 610 may be a tripod on wheels as shown in FIG. 6. Other types of mobile bases may be used, including power and/or unpowered mobile bases.

Within examples, the application of automated guided vehicles (AGVs) and optimization of warehouses (with or without AGVs) may require accurate geometric information about the environment (e.g., accurate maps). Accurate facility maps may lead to identification of facility/workflow inefficiencies in both manual and automatic vehicle environments (e.g., racks too close together to allow two power industrial trucks to pass). Facility layouts (e.g., CAD models) are used to guide the building design and construction process, and may not always updated to reflect the real world. Therefore, they often contain inaccuracies and may not be considered trustworthy (e.g., a CAD may contain correct and accurate walls while racks and other infrastructure added later may be off by considerable amounts, e.g., 30 centimeters). In some examples, a pre-mapping device such as shown in FIG. 6 may be used to help generate accurate facility maps that enable optimized AGV and/or manual fork truck deployments.

A pre-mapping system may be used for a number of different applications. In some examples, a map of a warehouse (e.g., a geometric map containing walls and other infrastructure such as racks) may be generated and compared to an existing CAD model of the space. This process may reveal that the CAD model does not properly reflect the real world. Facility maps may then be updated to the correct layouts. In further examples, warehouse mapping may be used to deploy a robotic system in simulation to demonstrate how the warehouse can be automated using robotic AGVs and/or optimized using manually-driven powered industrial trucks.

In additional examples, a warehouse space may be pre-mapped to assist in planning a marker (reflector) setup (e.g., locations to place reflectors in the environment) based on the map. Such a process may be used to speed up the planning phase of an AGV deployment.

In further examples, a warehouse map and reflector setup may be determined early in the AGV rollout process before sending any vehicles to the location (or while the vehicles are shipped to save time). Once vehicles arrive, they may upload the map(s) and start driving or use the map(s) to initialize and bootstrap subsequent mapping runs with vehicles.

In some examples, accurate mapping can also be used to determine if a new generation of manual trucks will be able to operate in an existing facility or if the facility will require modification. In additional examples, accurate maps may also allow for identification of manual facility inefficiencies like placement of racking, charging stations, or parking stations relative to workflows and travel distances. This information may be used to provide suggestions for more optimal facility layouts.

As mentioned, the computing unit 606 may be configured to run various mapping functionality based on sensor data collected by sensor 602. In some examples, the mapping functionality may include a hierarchical pose graph SLAM and bundle adjustment to build both a warehouse map and a reflector map. The functionality may produce both maps by switching between contours/distance measurements and marker detections in order to map a warehouse with only a partial reflector setup or no reflector setup at all. The mapping functionality may additionally include automatically aligning generated maps with the CAD model of the warehouse. The mapping functionality may additionally include bootstrapping the mapping process with a previously built map (e.g., a new map may be automatically aligned with both a CAD model and a previous map, with reflector positions bootstrapped from the previous map).

An example process may include retrieving results of a mapping run using the device illustrated in FIG. 6, including storage, visualization, etc. The retrieved results may then be applied for various functions, including uploading to vehicles for navigation, uploading to vehicles for new mapping runs (bootstrapped with results from the prior run), importing the results into a component that shows deployment of a system in simulation, importing the results into a component that compares a generated map with an existing CAD model, and/or importing the results into a component that assists with automated reflector planning.

IV. EXAMPLE LOCALIZATION OF A ROBOT IN AN ENVIRONMENT

Figure 7:
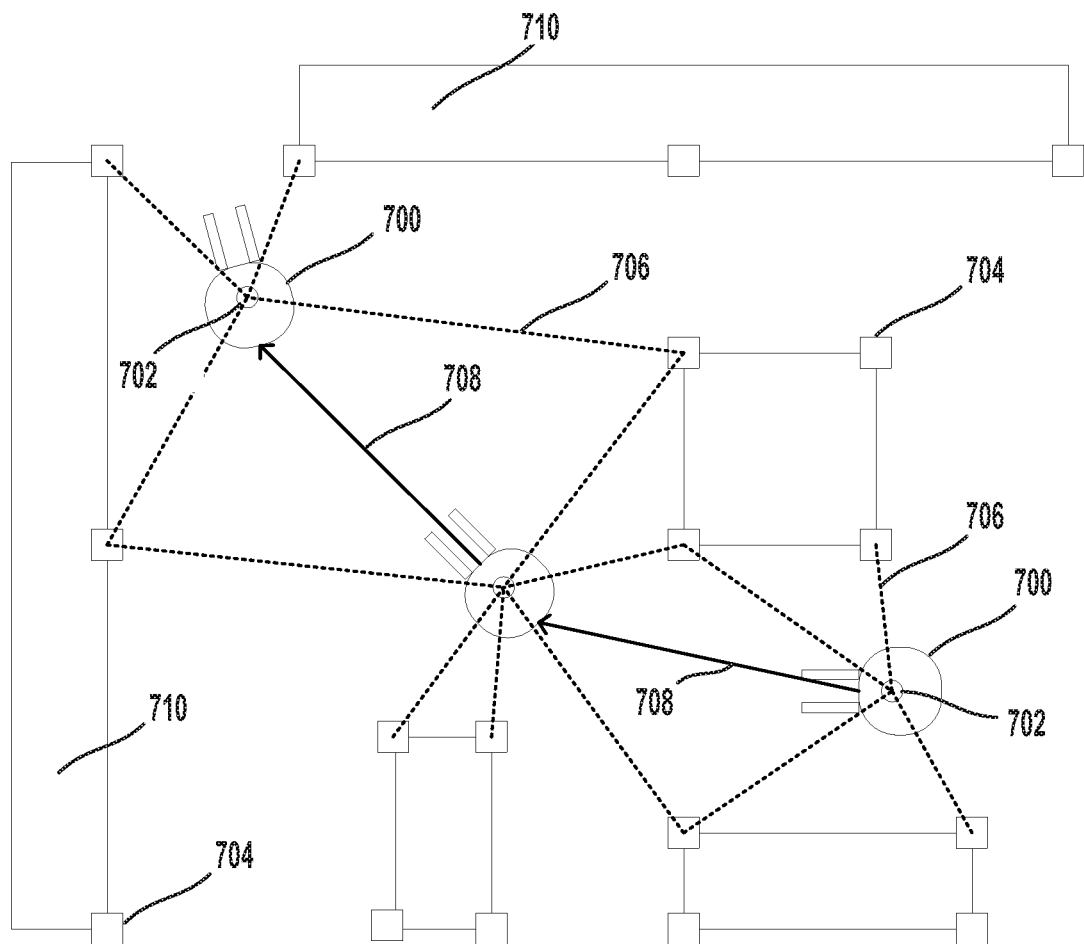
FIG. 7 shows a robot navigating within an environment, according to an example embodiment.

FIG. 7 shows a robot navigating within an environment, according to an example embodiment. A location and orientation of robot 700 relative to the environment may be estimated, enabling the robot to navigate through the environment accordingly. Particularly, the pose may indicate the location and orientation of the robot within the environment.

A computing system may determine the pose of robot 700 based on received signals 706 from one or more sensors 702. Signals 706 provided by sensor 702 may be reflected by retroreflective markers placed in various locations in a warehouse. For instance, the robot may use a light ranging and detection (LIDAR) unit that emits light to an area surrounding the robot, and markers positioned in the area surrounding the robot may reflect the light back for detection by a sensor of the robot.

Reflected signals 706 received at sensor 702 may indicate locations of the markers relative to the robot. A computing system may use these determined locations of the markers to develop a map of the markers. In some cases, the computing system may use detected markers to supplement an already generated map of the marker positions. For instance, the computing system may modify the position of one or more markers in the map using new measurements.

A computing system may also determine the pose of the robot as the robot navigates using the map of markers. The computing system may match detected markers with markers in the map to determine the robot's position and orientation. The locations of the markers in relation to obstacles 710 within the environment may be predetermined. For example, the locations of obstacles may also be mapped. The robot may make movements 708 to navigate within the environment while avoiding the obstacles based on the estimated pose and the predetermined locations of the obstacles.

Figure 8:
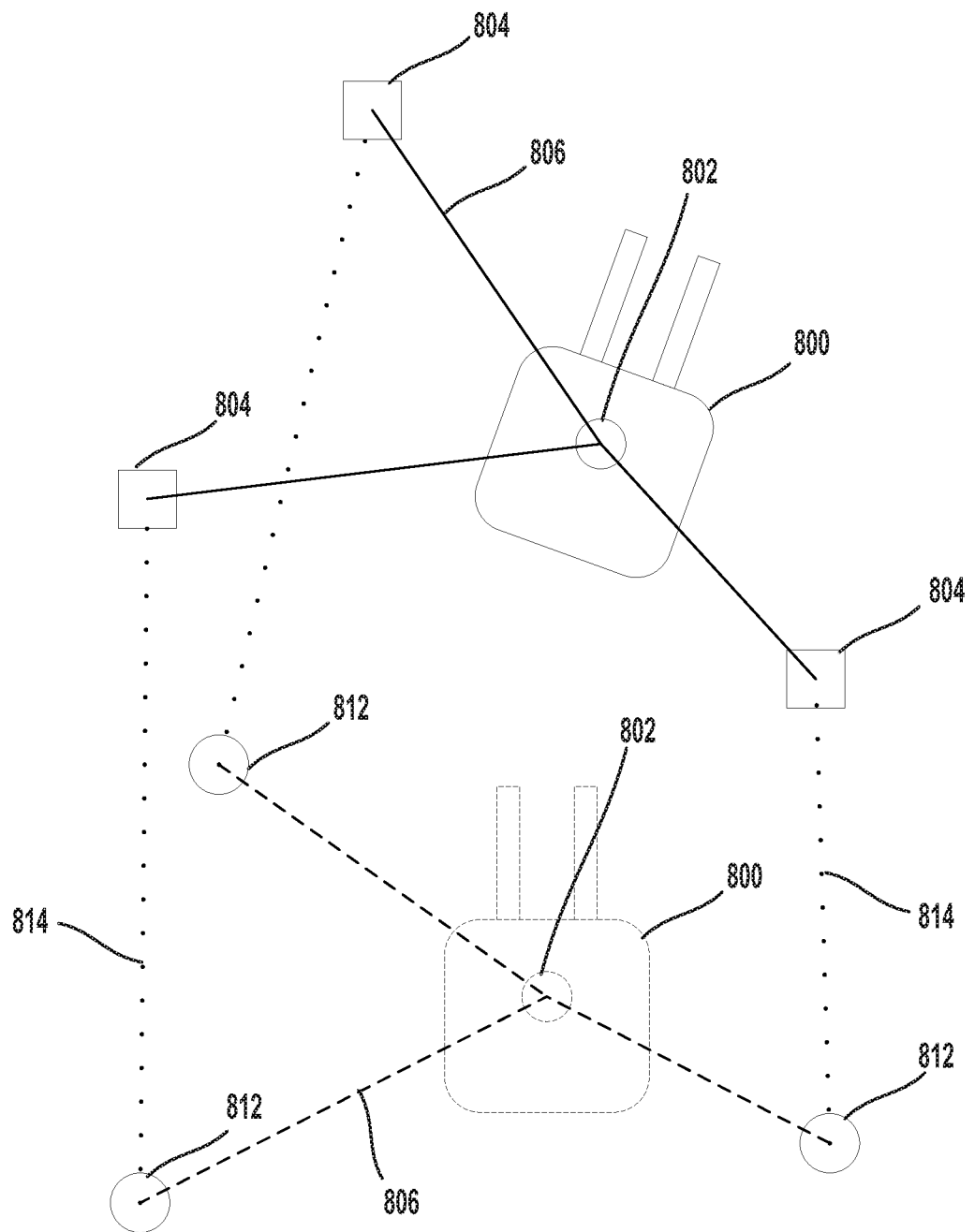
FIG. 8 shows a robot associating detections with mapped landmarks, according to an example embodiment.

FIG. 8 shows a robot associating detections with mapped landmarks, according to an example embodiment. Detected signals 806 from candidate landmarks 812 may be received by one or more sensors 802 of a robot 800. The signals may be indicative of locations of the candidate landmarks in relation to the robot. The candidate landmarks may be transformed to align with mapped landmarks 804. Associations 814 may be formed between the candidate landmarks and the mapped landmarks that result in a minimal distance between the transformed candidate landmarks and the mapped landmarks. For example, the associations 814 may be formed using a least means squared method such as an iterative closest point (ICP) method. The candidate landmarks may be translated and rotated based on the associations 814 between the candidate landmarks and the mapped landmarks. The pose of the robot may be inferred by similarly translating and rotating the robot.

Figure 9:
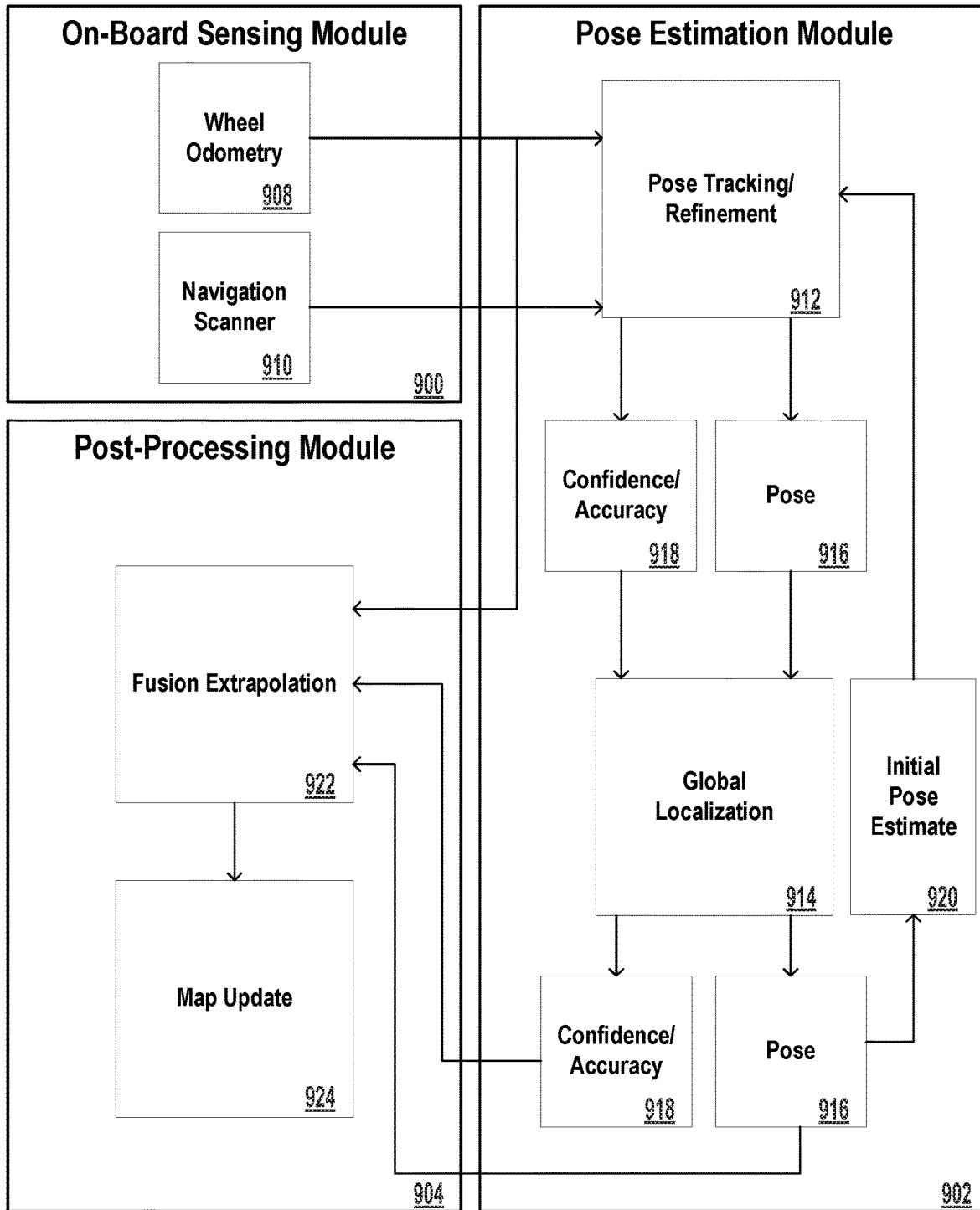
FIG. 9 is a functional block diagram illustrating modules of a robot control system, according to an example embodiment.

FIG. 9 is a functional block diagram illustrating modules of a robot control system, according to an example embodiment. The robot control system may include one or more sensors as part of an on-board sensing module 900. The sensors may provide data that is indicative of wheel odometry 908 of the robot. The sensors may also include a navigation scanner 910. The navigation scanner 910 may be configured to receive signals from candidate landmarks in an environment of the robot.

A pose estimation module 902 of the robot control system may indicate the location and orientation of the robot with respect to mapped landmarks in the environment. The pose estimation module 902 may include software that performs functions based on inputs from the on-board sensing module 900. For example, each time the navigation scanner 910 performs a scan, sensor data from the on-board sensing module may be processed by the pose estimation module 902 to determine a current location and orientation of the robot in the environment. The pose tracking/refinement block 912 and global localization block 914 of the pose estimation module 902 represent processing steps, while the pose block 916, confidence/accuracy block 918, and initial pose estimate block 920 represent outputs of the processing blocks 912 and 914.

The pose estimation module 902 may operate in two modes. In a first mode, the pose estimation module 902 may have an initial pose estimate 920 of the robot, and the pose tracking/estimate block 912 may update the initial pose estimate 920. The pose tracking/refinement 912 may utilize the wheel odometry 908 and data from the navigation scanner 910 in conjunction with the initial pose estimate 920 to identify the location of the robot in relation to candidate landmarks. The pose tracking/refinement block 912 may associate the candidate landmarks to particular mapped landmarks that are near to the initial pose estimate 920. The pose estimation module 902 may further provide a pose estimate 916 based on the association, and a confidence/accuracy 918 of the pose estimate. The confidence/accuracy 918 may indicate that the initial pose estimate is adequate, or that it requires further refinement. Also in the first mode, the pose 916 and confidence/accuracy 918 determined by the pose tracking/refinement block 912 may be used in the post-processing module 904 to determine a refined pose estimate of the robot. Meanwhile, the global localization block 914 may be skipped. Further, the pose estimate 916 derived during pose tracking/refinement 912 may be treated as the initial pose estimate 920 of the robot for use in subsequent pose estimations.

In a second mode, the pose estimation module 902 may have no initial indication of where the robot is within the environment. In other words, the initial pose estimate 920 may not yet be determined. In the second mode, the pose estimation module 902 may utilize global localization 914 rather than pose tracking/refinement 912 to determine the pose of the robot. The global localization block 914 may test associations between the candidate landmarks and mapped landmarks across the entire environment of the robot. The global localization block 914 may also output a pose estimate 916 and confidence/accuracy 918. Also in the second mode, the pose 916 and confidence/accuracy 918 determined by the global localization block 914 may be used in the post-processing module 904 to determine a refined pose estimate of the robot. Further, the pose estimate 916 derived during global localization 914 may be treated as the initial pose estimate 920 of the robot for use in subsequent pose estimations.

A post-processing module 904 may be used to refine the pose estimation derived from the pose tracking/refinement or global localization. The post-processing module may perform fusion extrapolation 922 of the pose estimate and confidence/accuracy of the localization module, and wheel odometry of the on-board sensing module. During fusion extrapolation, the refined pose estimate may rely more on the estimated pose provided by the localization module when there is a high confidence/accuracy. Conversely, the refined pose estimate may rely more on the wheel odometry when there is a low confidence/accuracy. Further, the post-processing module may provide a map update 924 based on the provided confidence/accuracy and refined pose estimate. For example, the map update may update locations of the mapped landmarks based on the refined pose estimate. In other examples, the map update may update statistical information associated with the mapped landmarks used to generate the refined pose estimation.

Each of the functions performed by the robot control system of FIG. 9 may be performed periodically. For example, navigation scanner 910 may perform scans at 8 Hz, while the wheel odometry 908 may update at 100 Hz. As another example, the processing blocks 912 and 914 of the pose estimation module may receive data from the on-board sensing module at 8 Hz, and may produce poses 916 and confidence/accuracies 918 at 8 Hz. Different frequencies are possible as well.

V. EXAMPLE SLAM IMPLEMENTATIONS

A computing system may perform SLAM or similar processes to determine a location of a robot while also detecting positions of markers within the environment. For example, the computing system may detect markers based on the intensity of measurements within laser scans and may match observed markers from different sets of measurements.

Potential errors can arise when attempting to associate detected markers across different scans, such as failures that result from a lack of enough detected markers or wrong associations between detected markers. A computing system may overcome these and other potential errors using a nearest neighbor approach that may associate each detected marker to the closest marker that has been detected multiple times. Particularly, the nearest neighbor approach may involve determining the nearest marker using a Euclidean distance or other distance determinations (e.g., Mahalanobis distance). In some instances, the computing system may also be configured to utilize a validation gate to determine when a marker has previously been observed or when the marker should be added as a newly detected landmark. The results of the data association between detected markers can enable the computing system to estimate a current pose of the robot within the environment.

The computing system may use control instructions from the robot's control system when estimating its current pose. For instance, odometry data provided from sensors positioned on wheels of the robot may be used to estimate changes in the current pose of the robot. As an example, a robot may have an initial 2D position (x,y) with initial orientation $\theta$. After changing position by ($\Delta x$, $\Delta y$) and changing orientation by ($\Delta \theta$) as indicated by the controls applied by the control system, the updated pose of the robot is (x+$\Delta x$, y+$\Delta y$) with updated orientation ($\theta$+$\Delta \theta$). The computing system may further refine the estimated pose using the detected markers within incoming sensor scans.

The computing system may also estimate a current pose of a sensor (or the robot) using detected markers and other measurements of the environment (e.g., contour measurements representing distances to nearby surfaces). When the prior pose of the sensor/robot is known, the computing system may use the recent pose estimation to predict where markers should be located based on prior detection of markers. The computing system may continue to monitor changes in the robot's pose using subsequent measurements.

In some instances, the computing system may modify the uncertainty associated with each observed marker to reflect recent changes based on new measurements, and may also add newly detected markers to the map of markers in the environment. The computing system may perform SLAM iteratively to continuously update the map of markers in the space enabling the robot to map the environment while also navigating safely.

In another example implementation, a computing system may perform a modified SLAM process that uses one or more operations, such as initial pose monitoring, local window optimization, global optimization, and complete bundle adjustment. The computing system can often refrain from subsequent operations after the initial pose estimation. In effect, the computing system may determine whether or not to perform the next, computationally more expensive operation during performance of the preceding operation.

The computing system may add an initial scan of the environment to an underlying pose graph that represents a series of poses the robot. The initial scan may be assigned as pose (0) to form the basis of a map's coordinate frame. Thereafter, for every subsequent scan of the environment, the computing system may refer to the prior node added in the graph (e.g., pose (0)) and update the current pose accordingly. In some instances, the computing system may update the pose using a registration process (e.g., an Iterative Closest Point (ICP) algorithm)) for marker-based localization and the Euclidean point-to-point distance between pairs of matching marker detections and mapped landmarks as shown in the transform of equation [1].

$$T^* = \mathrm{argmin} \Sigma_i \Sigma_j w_{ij} \|m_j - T(d_i)\|^2 \qquad [1]$$

Equation [1] may be used to determine an error for a single link in a pose graph. In other words, a computing system may use equation [1] to determine if an error exists between two different poses. As such, a pose graph may include numerous links producing the optimization problem for reducing error. Equation [1] may assume constant weights of $w_{ij}=1$ for matches. In some instances, however, the computing system may be configured to apply non-constant weights to give a higher influence to markers detected closer to the robot or to detected markers that have been deemed stable by the computing system. The computing system may also factor detection rate of the markers and use a different error function, such as covariance-to-covariance metrics as in a generalized registration process (e.g., ICP). For every pair of matches between markers, the computing system may optimize the whole pose graph (or a partial graph) to solve individual ICP problems between two nodes simultaneously.

In some cases, matching of laser scans and marker detections within the scans may result in slight errors and inaccuracies. As such, local window optimization may overcome unwanted effects by refining the estimated pose via a pose graph optimization in a local window. Particularly, the computing system may optimize the estimated pose while keeping prior poses of neighboring nodes constant in the pose graph and limiting the use of older pose estimates that are outside the local window. For example, when scans only produce a few detected markers nearby the robot, the computing system may utilize local window optimization to improve the pose estimate.

The computing system may add a new node to a pose graph when the robot travels a distance or turns an angle between scans of the environment that exceed a maximum distance or a maximum turn angle. Particularly, the computing system may add the current scan to the underlying pose graph as the new reference scan that can be used for subsequent pose determinations.

The computing system may further determine a local neighborhood of other nodes in the pose graph and optimize the resulting sub-graph (i.e., the local neighborhood of nodes) to refine the estimate of the robot's current pose as well the other poses represented by the nodes in the local window. The computing system may keep nodes that connect the sub-graph to the rest of the pose graph constant and optimize all other poses within the sub-graph to refine the current pose while factoring new scans (i.e., information that has not been available when initial computing the respective poses).

The computing system may also perform loop detection and verification. For instance, if the local window contains graph nodes created during a previous pass through that area of the environment, the computing system may trigger a global optimization of the pose graph using the prior scans of the area. Global optimization may optimize all nodes in a pose graph representing changes in the robot's pose and enable building a map of marker positions. The computing system may add an edge with both poses to the graph when a marker is detected from two poses/nodes. By changing the two poses, the computing system may minimize the distances between the two points and obtain new robot poses. The computing system may go through all nodes and extract all marker detections in the world frame to obtain a map.

During global optimization, the computing system may match marker detections (or match contour scans of the environment) thereby form blocks within a large optimization problem that requires all poses in the graph to be optimized in order to minimize the differences between all found matches of markers detected within different scans of the environment. The computing system may match and optimize the pose graph in a repeated process until the global system converges to produce accurate pose estimations of the robot.

To account for noise and obtain a more accurate map of marker positions, the computing system may perform a final complete adjustment to optimize both the path of the robot and the map of marker positions. The computing system may optimize poses in the graph together with respective scans to build a new map of markers and may further correct measurement errors and other inaccuracies by refining the positions of mapped reflectors during bundle adjustment. Particularly, in some instances, aggregated marker detections may match very well in the pair-wise formulation of the global graph optimization, but may not accurately represent the actual positions of markers in the environment. Therefore, the computing system may use complete bundle adjustment to improve the accuracy of individual marker positions in the map of marker positions.

Table 2 below illustrates the various steps and corresponding pose graphs of the modified SLAM process.

TABLE 2

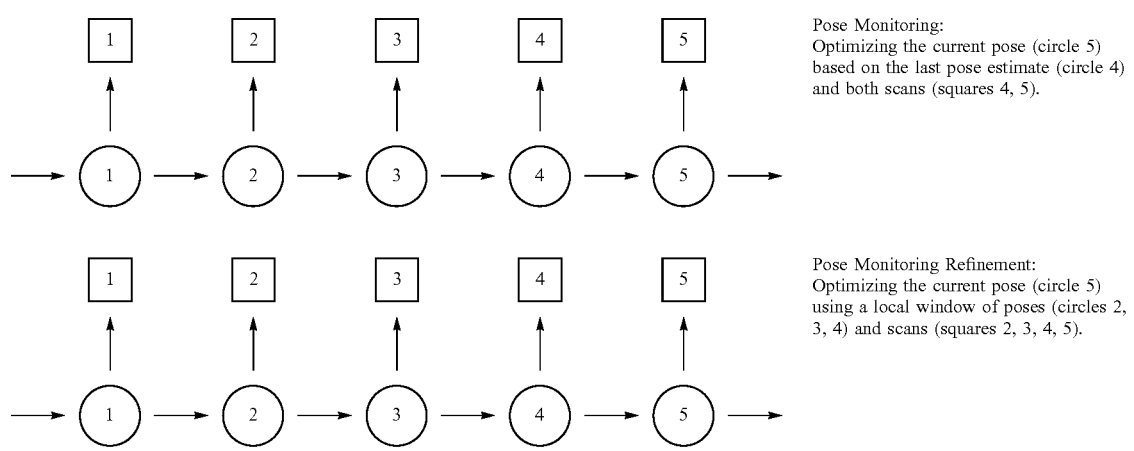

Pose Monitoring:
Optimizing the current pose (circle 5) based on the last pose estimate (circle 4) and both scans (squares 4, 5).

Pose Monitoring Refinement:
Optimizing the current pose (circle 5) using a local window of poses (circles 2, 3, 4) and scans (squares 2, 3, 4, 5).

TABLE 2-continued

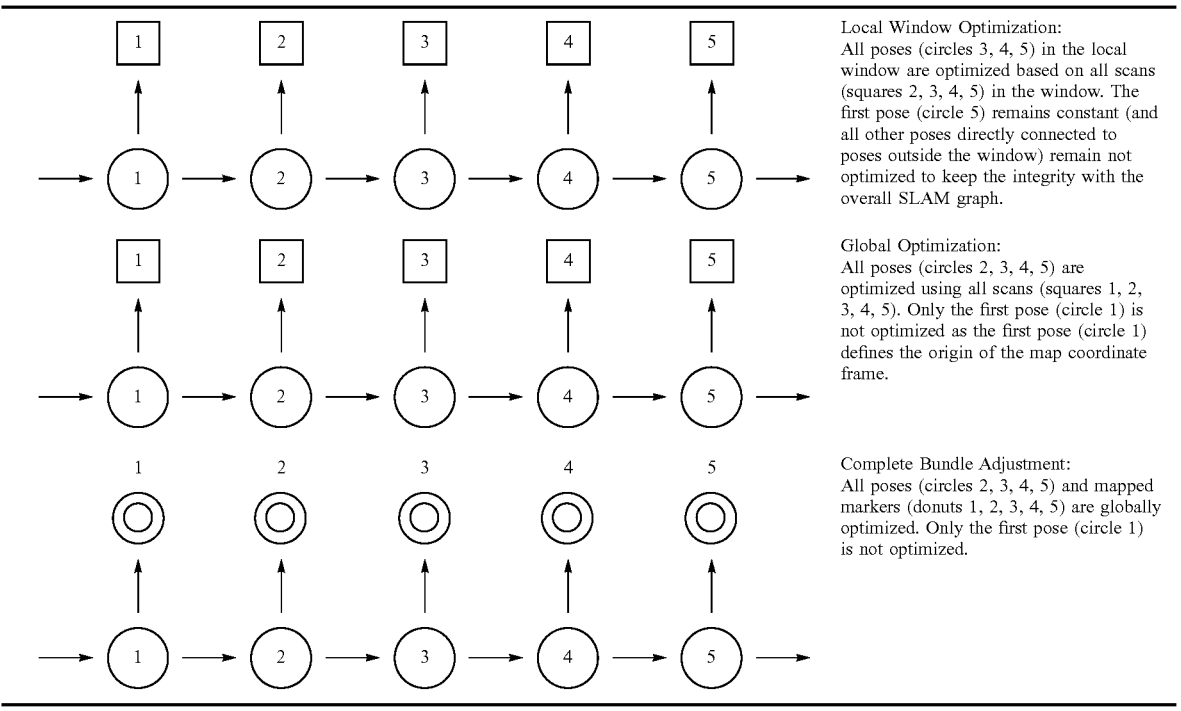

Local Window Optimization:
All poses (circles 3, 4, 5) in the local window are optimized based on all scans (squares 2, 3, 4, 5) in the window. The first pose (circle 5) remains constant (and all other poses directly connected to poses outside the window) remain not optimized to keep the integrity with the overall SLAM graph.

Global Optimization:
All poses (circles 2, 3, 4, 5) are optimized using all scans (squares 1, 2, 3, 4, 5). Only the first pose (circle 1) is not optimized as the first pose (circle 1) defines the origin of the map coordinate frame.

Complete Bundle Adjustment:
All poses (circles 2, 3, 4, 5) and mapped markers (donuts 1, 2, 3, 4, 5) are globally optimized. Only the first pose (circle 1) is not optimized.

The computing system may continue to update the map of marker positions by aggregating marker detections of aligned scans. For each detected marker, the computing system may check to see if the detected marker matches a marker already added to the map, which may involve using a nearest neighbor search with a maximum distance corresponding to the expected inter-marker distance (e.g., 0.5 meter distance threshold) to identify matches between markers detected within multiple scans of the environment. If the computing system finds that a detected marker matches a marker positioned in the map, the computing system may adjust the position of the marker within the map if needed. In some instances, the computing system may speed up the matching process using an approximate nearest neighbor search in a kd-tree of the map of markers that can be rebuilt after adding new markers or rebuilding the map in general.

In some examples, a computing system may determine matches by going through all points in a set and matching each point with the closest point in another set of points. In particular, closest points within distance thresholds may be considered matches. In other examples, a computing system may use kd-trees or other search structures that may enable searching for matches faster.

In order to identify marker detections that are likely false detections, the computing system may monitor a local detection history to determine whether the marker is stable. Stable markers are included in the final map of marker positions as either new markers or to correct previously added markers. The computing system may distinguish an intermediate map representation that contains information about all markers detected within scans of the environment from a final map of the marker positions that only contains stable markers and no false detections likely caused by highly reflective surfaces.

In an example embodiment, the computing system may monitor a local detection history for each mapped marker to remove false detections. For instance, in a local window of n scans, the computing system may add a negative (for every mapped marker) for every scan added and a positive if the scan contained a marker detection matching the mapped marker. An example of the local window of detection is shown below in table 3.

TABLE 3

| X | X | X | X | X | X | o | X | X | X | o | X | X | o | X | X | X | X | o | o |

Local detection history:
Square = a scan of the environment
"X" = detected marker,
"o" = no marker detected.
window size 20 with 15 detections = 75% detection rate As shown in table 3, the computing system may use a window size of n=20 scans of the environment. Once the local window of a mapped marker shows a threshold amount of positives (e.g., 75% positives of the total scans), the computing system may consider the marker stable. As such, the computing system may continue to update stable marker, which cannot thereafter become unstable unless manually removed or if considered unstable during a complete rebuilt of the final map of markers. In the case the graph considerably changes from adding new scans (e.g., in the case of global optimization), the computing system may rebuild the map of markers, which may involve using a higher threshold for determining when a marker is stable (e.g., over 80% positives threshold of the total scans).

In some examples, the computing system may be configured to update the position of markers within the map of markers. For instance, to update the position of a mapped marker, the computing system may incrementally compute the mean $\mu$ over all n positions $p_i$ of matching marker detections as shown in equation [2].

$$\mu_n = \frac{1}{n}\sum_{i=1}^{n} p_i = \mu_{n-1} + \frac{1}{n}(p_n - \mu_{n-1}) \qquad [2]$$

As shown in equation [2], the computing system may weigh all marker detections equally, but may use incremental weighted mean in some examples to give markers detected closer to the sensor a higher weight than markers detected far away from the robot since the noise in the measured positions likely increase with distance. The computing system may also compute an incremental covariance for the aggregated position to provide an additional way of discriminating false from true marker detections since a false detection may likely show a larger variance. Further, the computing system may also switch from point-to-point errors to covariance-based error functions in pose monitoring and the cost functions of the graph optimizations.

VI. EXAMPLE SYSTEMS AND METHODS

Figure 10:
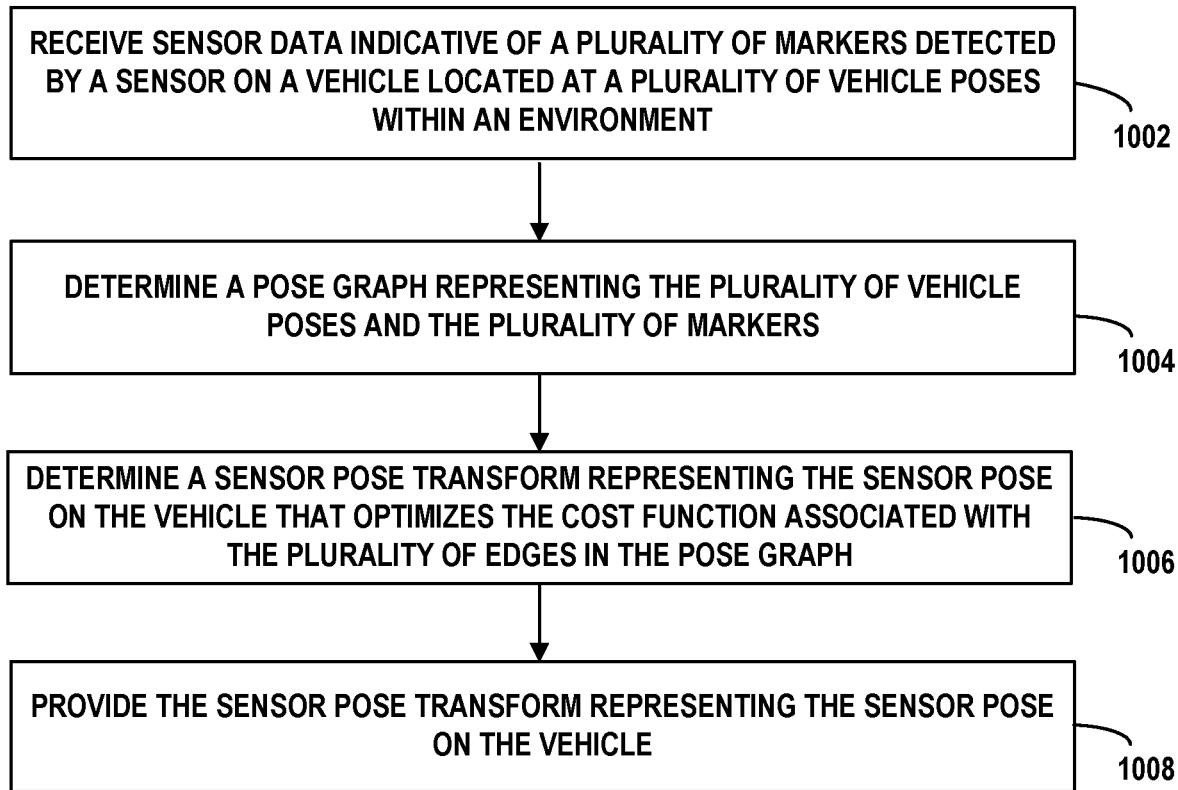
FIG. 10 is a flowchart that shows an example method for localization and calibration.

FIG. 10 is a flowchart illustrating a method 1000, according to an example implementation. Particularly, method 1000 may be implemented to perform localization and calibration.

Method 1000 (and other processes and methods disclosed herein) presents a method that can be implemented within an arrangement involving, for example, robotic device(s) 120 (or more particularly by components or subsystems thereof, such as by a processor and a non-transitory computer-readable medium having instructions that are executable to cause the device to perform functions described herein). Additionally or alternatively, method 1000 may be implemented within any other arrangements and systems.

Method 1000 and other processes and methods disclosed herein may include operations, functions, or actions as illustrated by one or more of blocks 1002, 1004, 1006, and 1008. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 1000 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM).

The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems and may be considered a computer readable storage medium, for example, or a tangible storage device. In addition, for the method 1000 and other processes and methods disclosed herein, each block in FIG. 10 may represent circuitry that is wired to perform the specific logical functions in the process.

At block 1002, method 1000 may include receiving sensor data indicative of a plurality of markers detected by a sensor on a vehicle located at a plurality of vehicle poses within an environment. A computing system (e.g., control system, remotely positioned computing system) may receive a series of sensor measurements of the environment from a sensor or sensors coupled to a vehicle (robot) while the vehicle navigates the environment. As a result, the computing system may receive sensor data that represents positions of markers in the environment from different poses of the vehicle as the vehicle continues to change position and orientation relative to the environment.

In some examples, the computing system may receive scans from a laser scanner as the robot navigates. The computing system may detect landmarks (e.g., markers) positioned in the environment within the incoming laser scans. For instance, the computing system may receive measurements that include detect markers arranged along a horizontal plane from a 2D laser scanner on the robot. Accordingly, the computing system may detect markers in the horizontal plane in each scan from the laser scanner. In other examples, the computing system may receive sensor data from other types of sensors coupled to a mobile robot, such as camera images, RADAR, etc.

At block 1004, method 1000 may include determining a pose graph representing the plurality of vehicle poses and the plurality of markers. In particular, the pose graph may include a plurality of edges associated with a cost function representing distance measurements between matching marker detections at different vehicle poses. For instance, the pose graph may include edges that result from pairwise matching of markers detected from sensor data provided at different vehicle poses. The distance measurements may incorporate the different vehicle poses and a sensor pose on the vehicle.

As a robot navigates an environment, a computing system may perform SLAM or a similar process to determine different poses of the robot relative to the environment for the pose graph. Each robot pose may represent a position and orientation of the robot with respect to markers positioned at various locations within the environment. Although the measurements of the environment are provided by a sensor positioned on the robot, the computing system may use a fixed sensor to robot transform that assumes that the sensor remains constant relative to the robot. In such a configuration, the computing system may use incoming scans to determine new robot poses and update the pose graph to include the additional robot poses. The computing system may also simultaneously develop a map of the markers that specifies locations of the detected makers within the environment. Similar to updating the pose graph, the computing system may also refine the map of markers as new sensor measurements are received from the sensor of the robot.

SLAM or similar methods for localizing a robot within the environment may result in potential inaccuracies. To account for the inaccuracies, the computing system may perform iterations of SLAM or other processes to modify and update robot poses and marker positions based on newly acquired measurements. In some cases, the new measurements may confirm the prior poses and positions of the makers. In others, however, the computing system may update one or more prior robot poses and/or prior positions of markers in the map.

robot poses 1102, 1106, 1110, sensor poses 1104, 1108, 1112, and marker detections 1114, 1116, 1118, and 1120.

Pose graph 1100 represents sensor calibration as a variant of a pose graph-based SLAM problem in which the sensor pose of the robot is a parameter being optimized. An example cost function based on pose graph 1100 represents the distance between matching detected markers in scans of the environment incorporating both robot poses in the map of markers and sensor pose on the robot. Table 4 represents example cost functions associated with pose graph 1100.

TABLE 4

| Cost Function 1 | $^{Map}T_{Robot,\,i}\ ^{Robot}T_{Sensor}\ ^{Sensor}\text{Detection} - {}^{Map}T_{Robot,\,j}\ ^{Robot}T_{Sensor}\ ^{Sensor}\text{Detection}$ |
|---|---|
| Cost Function 2 | $^{Map}T_{Robot,\,i}\ ^{Robot}T_{Sensor}\ ^{Sensor}\text{Detection} - {}^{Map}\text{Landmark (error in map)}$ |

As indicated above, a computing system may hold the sensor pose relative to the robot constant when determining robot poses within the environment. In some instances, however, the position or orientation of the sensor may change relative to the robot, which may result in errors when determining robot poses or positions of markers within the environment. The sensor pose may cause other inaccuracies within examples.

To account for potential inaccuracies that might arise from the pose of the sensor while performing SLAM, a computing system may develop the pose graph to involve a cost function that incorporates the pose of the sensor. While performing localization (or subsequent to localization), the computing system may then identify when the sensor pose differs from prior expectations.

At block 1006, method 1000 may include determining a sensor pose transform representing the sensor pose on the vehicle that optimizes the cost function associated with the plurality of edges in the pose graph. In particular, the determined sensor pose transform may indicate a position and an orientation of the sensor relative to a coordinate frame fixed to the vehicle. As such, the determined sensor pose transform may be used to avoid errors that might arise when using a fixed sensor pose transform.

In some examples, the computing system may determine a sensor pose transform while performing SLAM. For instance, the computing system may determine robot poses and positions of markers within the environment using incoming sensor data and then proceed to determine the sensor pose transform that optimizes the cost function. The computing system may alternate between updating the robot poses and positions of markers with updating the determined sensor pose transform. The computing system may use matches of markers detected at different robot poses to assist in updating the sensor pose.

In further examples, the computing system may simultaneously determine the sensor pose transform and robot poses relative to a map of markers in order to optimize the cost function associated with the edges in the pose graph. For instance, the computing system may determine the sensor pose transform as the robot navigates within the environment incorporating both new measurements and new robot poses when determining the sensor pose transform. The new measurements and robot poses may also be used to adjust the sensor pose transform. Accordingly, the sensor pose transform may be continuously or periodically updated using new information to minimize potential errors.

Figure 11A:
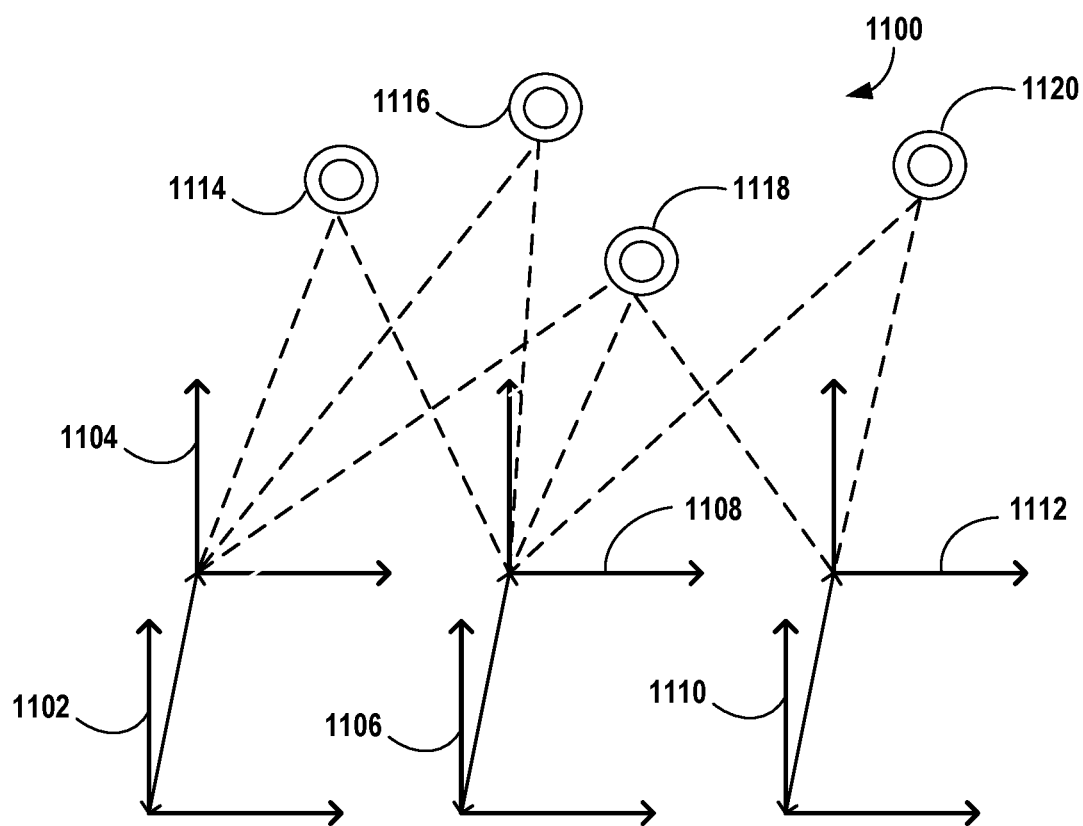
FIG. 11A illustrates a pose graph, in accordance with example embodiments.

FIG. 11A illustrates a pose graph, in accordance with example embodiments. As shown, pose graph 1100 includes Cost function 1 and cost function 2 shown in Table 4 represent two possible cost functions that may be optimized in order to optimize sensor pose calibration as part of a graph-based SLAM process. When using cost function 1, a computing system may use pairwise detection whenever a marker is detected at multiple robot poses. For example, marker detection 1114 may be detected at both robot pose 1102 and robot pose 1106. A computing system may insert the values (marker detection 1114 at both robot poses 1102, robot pose 1106) into cost function 1 to determine a first edge and cost function to minimize to reduce error. The computing system may repeat this process for other detected markers and robot poses.

Cost function 2, however, may require an accurate map that enables matches against a mapped marker location instead of pairwise matches between scans. A computing system may use cost function 2 with a separate edge for each of robot poses 1102, 1106 assuming the map indicates an accurate position of the marker 1114.

Robot poses 1102, 1106, and 1110 represent sets of positions and orientations of a robot moving within an environment and may be determined using SLAM or a similar process that involves marker detections 1114, 1116, 1118, and 1120. A computing system may receive sensor measurements from a sensor on the robot and determine the sequence of robot poses 1102, 1106, and 1110 relative to markers detections 1114, 1116, 1118, and 1120 as the robot navigates within the environment. For instance, the computing system may determine robot pose 1102 using marker detection 1114, 116, 1118, and further update robot pose 1102 based on subsequent measurements of the environment. The computing system may also determine a map of markers during SLAM based on marker detections 1114, 1116, 1118, and 1120.

As indicated above, when the computing system detects the same marker (e.g., marker detection 1114) from two different robot poses (e.g., robot poses 1102, 1106), the computing system may add another edge to pose graph 1100. The edges, however, might include inaccuracies that may be accounted for using additional iterations of SLAM to minimize all edges. The computing system may adjust simultaneously adjust robot poses 1102, 1106, and 1110 and positions of markers detections 1114, 1116, 1118, and 1120 to minimize all edges.

In some examples, the computing system may also determine and adjust a sensor pose transform to reduce potential errors that may arise from the pose of the sensor relative to the robot. Particularly, the computing system may adjust the sensor pose transform when the computing system identifies a different sensor pose than expected. As such, the computing system may identify differences among sensor poses 1104, 1108, and 1112 that may arise as the robot navigates the space and the computing system performs SLAM or a similar process.

At block 1008, method 1000 may include providing the sensor pose transform representing the sensor pose on the vehicle. For instance, the computing system may control the robot to navigate within the environment based on the determined sensor pose transform. The computing system may also store the sensor pose transform for subsequent use.

In some examples, a computing system may determine a subsequent pose graph representing subsequent robot poses and detected markers. The computing system may utilize additional sensor data received from the sensor when the robot is at the subsequent robot poses. Using the subsequent pose graph, the computing system may determine another sensor pose transform that can be used to check the original sensor pose transform. In some instances, the additional sensor pose transform may validate the original sensor pose transform. In other instances, however, the computing system may identify a difference between the original sensor pose transform and the additional sensor pose transform. If the sensor poses differ, the computing system may provide a calibration error signal to an operator or another receiver (e.g., robot control system) that indicates the difference.

In further examples, a computing system may determine robot poses relative to a map of the markers to optimize a cost function associated with edges in the pose graph. As discussed above, the map of markers may be generated using detected markers as the robot navigates within the environment. As such, the computing system may determine a sensor pose transform and robot poses relative to the map of markers simultaneously in order to optimize the cost function. The simultaneous determination may improve the efficiency associated with determining the sensor pose transform and robot poses.

In other examples, a computing system may determine a sensor pose transform subsequent to determining robot poses. For instance, the computing system may determine robot poses within the environment (with or without the map of markers) and proceed to determine a sensor pose transform after the robot poses. The computing system may hold robot poses fixed while determining the sensor pose transform subsequent to the robot poses.

In some examples, the computing system may determine the pose graph such that the pose graph includes additional edges associated with an additional cost function. The additional cost function may represent one or more additional distance measurements between marker detections at robot poses and mapped marker positions. The additional distance measurements may incorporate robot poses and the sensor pose on the robot. Accordingly, the computing system may determine a sensor pose transform such that the sensor pose transform also optimizes the additional cost function. In some instances, the computing system may also cause the robot to make a series of movements based on previously mapped marker positions to determine the sensor pose transform.

In other examples, sensor pose transforms for other sensors on the robot may also be determined. As an example, a computing system may receive additional sensor data that indicates positions of markers from a second sensor on the robot when the robot is located at robot poses within an environment. The computing system may determine a pose graph that further includes additional edges based on the sensor data from the second sensor and the second sensor pose on the robot. The pose graph incorporating additional edges may be used to determine a second sensor pose transform that represents the second sensor pose on the robot. The computing system may also provide the second sensor pose transform to the robot control system or other computing devices.

In some examples, a computing system may perform sensor calibration and motion model calibration together. In particular, the computing system may determine a pose graph that includes edges for both sensor calibration and motion model calibration. The computing system may then use localization results to build an aligned pose graph and use the aligned pose graph to optimize the motion model parameters. The computing system may subsequently optimize sensor calibration via marker detection edges. In some instances, the computing system may optimize the pose graph to fine-tune localization results and responsively re-compute sensor calibration and motion model parameters until reaching convergence.

In further examples, a computing system may determine the pose graph to further include additional edges associated with an additional cost function representing an error in consecutives robot poses based on a robot motion model. The computing system may determine one or more motion model parameters for the robot that optimize the additional cost function associated with the additional edges in the pose graph. The one or more motion model parameters may include one or more of a turning delay, a wheel diameter, a turning radius, and a center point of rotation. For instance, the computing system may determine the one or more motion model parameters while the edges in the pose graph and the sensor pose transform are held fixed. The computing system may also provide the one or more motion model parameters for the robot. In some cases, the computing system may also update one or more of the various robot poses in the pose graph based on the one or more motion model parameters. Accordingly, the computing system may subsequently adjust the sensor pose transform.

In some cases, errors may arise when incorporating odometry estimates when localizing a robot. In particular, a computing system may use motion model to transform measured steering and traction velocities into odometric motion and pose estimates. When a motion model is accurate, the computing system may associate a higher confidence level with the odometry estimates when performing localization. When a motion model is less accurate, however, the computing system may refrain from depending on the odometry estimates for localization. For instance, the computing system may avoid using odometry estimates when the robot is turning on the spot since the sensor scans may be distorted.

Figure 11B:
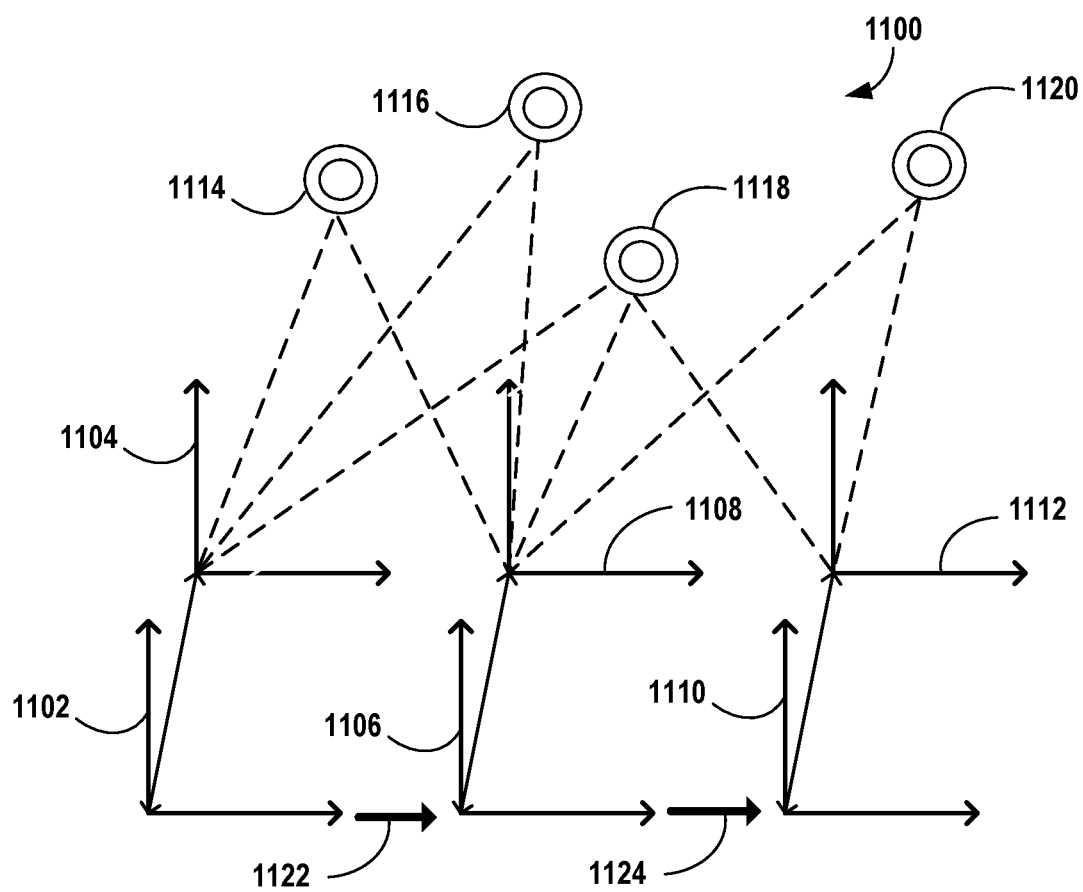
FIG. 11B illustrates a pose graph that incorporates motion model parameters, in accordance with example embodiments.

FIG. 11B illustrates a pose graph that incorporates motion model parameters, in accordance with example embodiments. Similar to FIG. 11A, pose graph 1100, as shown in FIG. 11B, further includes motion edges 1122, 1124 representing motions performed by the robot device between respective robot poses 1102, 1106, and 1110. Pose graph 1100 with motion edges 1122, 1124 may be used to optimize one or more motion model parameters of the robot.

A computing system may develop pose graph 1100 to incorporate motion edges 1122, 1124 based on expected motions of the robot between robot poses. The computing system may further optimize motion model parameters and then optimize sensor calibration looking at marker detection edges. The computing system may repeat the process until reaching convergence.

In some examples, a computing system may further incorporate motion model parameters of the robot that can be optimized in addition to or instead of sensor calibration. A computing system may use edges in pose graph 1100 that relate only to robot poses 1102, 1106, and 1110 and not rely upon detected marker detections 1114, 1116, 1118, and 1120 when determining motion model parameters. Particularly, the computing system may compare consecutive robot poses (e.g., robot poses 1102, 1106) to predicted motions of the robot (e.g., motion edges 1122, 1124) based on motion model parameters.

If the motion model parameters are inaccurate, the estimated robot motion may systematically deviate from actual robot motion. For instance, the computing system may analyze wheel odometry, time between scans, control instructions, and/or other factors when determining the robot motions represented by motion edges 1122, 1124 in pose graph 1100. Particularly, the computing system may determine pose graph 1100 to include additional edges (e.g., motion edges 1122, 1124) associated with an additional cost function representing an error in consecutive robot poses based on a robot motion model.

The computing system may then determine one or more motion model parameters for the robot that optimize the additional cost function associated with motion edges 1122, 1124 in pose graph 1100. For example, motion model parameters may include a turning delay, a wheel diameter, a turning radius, and a center point of rotation. In some instances, the computing system may hold the edges in pose graph 1100 and the sensor pose transform fixed when determining the one or more motion model parameters. The motion model parameter(s) for the robot may be provided to the robot control system or other computing systems.

In some examples, sensor pose calibration and motion model calibration may be performed separately or together (e.g., alternating sensor pose calibration and motion model calibration). In further examples, the computing system may update one or more of robot poses 1102, 1106, 1110 in pose graph 1100 based on the one or more motion model parameters. The computing system may also subsequently adjust the sensor pose transform after updating one or more robot poses 1102, 1106, and 1110 in pose graph 1100.

In a further example, a computing system may build a graph of poses using different types of edges (and different cost functions for the underlying optimization problem). The pose graph may include pairwise edges detected between matching marker detections in two or more scans and edges between marker detections and mapped marker locations. By incorporating the sensor pose on the robot, the computing system may optimize the sensor calibration. For optimizing motion model parameters, the computing system may use edges encoding relative robot motions (e.g., odometry), such as a 3D cost for the motion and the difference in heading. The computing system may initialize the motion model parameters with the localization results to determine an updated motion model. In some instances, the computing system may alternate between sensor calibration and motion model calibration.

In some examples, a computing system may simultaneously localize the robot and refine parameters of a determined motion model. For instance, the computing system may estimate the most likely robot trajectory and use the trajectory to optimize and check a sensor pose on the robot. The computing system may also optimize and check on the motion parameters. As a result, the computing system may identify discrepancies between expected parameters and actual parameters to provide a signal when the robot may require recalibration. For instance, the computing system may provide an alert to an operator.

In a further example, a computing system may perform an initial vehicle calibration by causing a vehicle to move forward and backwards while also turning left and right. By localizing the vehicle within the environment, the computing system may obtain pose estimates and motion estimates and use the estimates together with the original sensor data in a SLAM process to compute an updated sensor calibration and/or updated motion model parameters.

In another example, a computing system may perform an automatic calibration validation process, which may involve collecting logged data from vehicles over a period of time (e.g., one day). The computing system may then feed both the localization results and the logged sensor data into the same graph-based SLAM system and determine updated sensor calibrations and/or motion model parameters. If the updates show the same differences over several iterations, the computing system may confirm that prior calibration and/or motion model parameters used previously are off requiring subsequent calibration. For instance, the computing system may provide a signal to an operator reporting updated values that may replace prior calibration values.

VII. OTHER LOCALIZATION EMBODIMENTS

Though the detailed description above generally relates to simultaneous localization and calibration involving robotic vehicles within an environment, it should be understood that such description is provided for purposes of example, and should not be construed as limiting. For instance, the same systems and methods described above may be implemented to localize a manually-operated vehicle in the environment. Such localization may allow a human operator to view a map of the environment provided for display on the manually-operated vehicle that includes an indication of a current pose estimate of the manually-operated vehicle.

Further, the systems and methods described above may be implemented to localize other devices, such as a mapping sensor unit. For example, a mapping sensor unit may be moved to multiple positions within an environment to generate data used for mapping the environment. At each position, the sensor unit may be localized using one or more of the systems and methods described above. Such data may be used in generating a map of the environment. It should be readily understood by those having skill in the art that the systems and methods describe can be implemented to localize any number of vehicles, devices, or sensors disposed within an environment.

VIII. CONCLUSION

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

What is claimed is:

1. A method comprising:
receiving sensor data indicative of a plurality of markers detected by a sensor on a vehicle located at a plurality of vehicle poses within an environment;
determining a pose graph representing the plurality of vehicle poses and the plurality of markers, wherein the pose graph comprises a plurality of edges associated with a cost function representing a distance measurement between a matching marker detection at different vehicle poses, wherein the distance measurement incorporates the different vehicle poses and a sensor pose on the vehicle;
determining a sensor pose transform representing the sensor pose on the vehicle that optimizes the cost function associated with the plurality of edges in the pose graph;
determining a second pose graph representing a plurality of subsequent vehicle poses and the plurality of markers based on sensor data subsequently received at the plurality of subsequent vehicle poses;
determining a second sensor pose transform based on the second pose graph; and
validating the sensor pose transform based on the second sensor pose transform; and
providing the sensor pose transform representing the sensor pose on the vehicle.

2. The method of claim 1, further comprising:
determining the plurality of vehicle poses relative to a map of the plurality of markers to optimize the cost function associated with the plurality of edges in the pose graph.

3. The method of claim 2, wherein the sensor pose transform and the plurality of vehicle poses relative to the map are determined simultaneously to optimize the cost function associated with the plurality of edges in the pose graph.

4. The method of claim 2, wherein the sensor pose transform is determined subsequent to determining the plurality of vehicle poses, wherein the plurality of vehicle poses are held fixed while determining the sensor pose transform.

5. The method of claim 1, wherein the pose graph further comprises a plurality of additional edges associated with an additional cost function representing an additional distance measurement between a marker detection at a vehicle pose and a mapped marker position, wherein the distance measurement incorporates the vehicle pose and the sensor pose on the vehicle; and
wherein the sensor pose transform is determined to optimize the additional cost function associated with the plurality of additional edges.

6. The method of claim 5, further comprising causing the vehicle to make a series of movements based on previously mapped marker positions to determine the sensor pose transform.

7. The method of claim 1, wherein the sensor pose transform comprises a position and an orientation of the sensor relative to a coordinate frame fixed to the vehicle.

8. The method of claim 1, further comprising controlling the vehicle to navigate within the environment based on the determined sensor pose transform.

9. The method of claim 1, further comprising:
identifying a difference between the sensor pose transform and second sensor pose transform; and
providing a calibration error signal indicating the identified difference.

10. The method of claim 1, further comprising:
receiving second sensor data indicative of the plurality of markers detected by a second sensor on the vehicle at the plurality of vehicle poses within an environment;
determining the pose graph to further include a plurality of additional edges based on the second sensor data and a second sensor pose on the vehicle;
determining a second sensor pose transform representing the second sensor pose on the vehicle based on the pose graph; and
providing the second sensor pose transform.

11. The method of claim 1, further comprising:
determining the pose graph to further include a plurality of additional edges associated with an additional cost function representing an error in consecutive vehicle poses based on a vehicle motion model;
determining one or more motion model parameters for the vehicle that optimize the additional cost function associated with the plurality of additional edges in the pose graph; and
providing the one or more motion model parameters for the vehicle.

12. The method of claim 11, wherein the one or more motion model parameters are determined while the plurality of edges in the pose graph and the sensor pose transform are held fixed.

13. The method of claim 12, further comprising:
updating one or more of the plurality of vehicle poses in the pose graph based on the one or more motion model parameters; and
subsequently adjusting the sensor pose transform.

14. The method of claim 11, wherein the one or more motion model parameters comprise one or more of a turning delay, a wheel diameter, a turning radius, and a center point of rotation.

15. A system comprising:
a vehicle;
a sensor coupled to the vehicle;
a computing system;
a non-transitory computer readable medium, and program instructions stored on the non-transitory computer readable medium and executable by the computing system to:
receive sensor data indicative of a plurality of markers detected by the sensor on the vehicle located at a plurality of vehicle poses within an environment;

determine a pose graph representing the plurality of vehicle poses and the plurality of markers, wherein the pose graph comprises a plurality of edges associated with a cost function representing a distance measurement between a matching marker detection at different vehicle poses, wherein the distance measurement incorporates the different vehicle poses and a sensor pose on the vehicle, wherein the pose graph further comprises a plurality of additional edges associated with an additional cost function representing an additional distance measurement between a marker detection at a vehicle pose and a mapped marker position, wherein the distance measurement incorporates the vehicle pose and the sensor pose on the vehicle;

determine a sensor pose transform representing the sensor pose on the vehicle that optimizes the cost function associated with the plurality of edges in the pose graph wherein the sensor pose transform is determined to optimize the additional cost function associated with the plurality of additional edges; and provide the sensor pose transform representing the sensor pose on the vehicle.

16. The system of claim 15, wherein the computing system is further configurable to determine the plurality of vehicle poses relative to a map of the plurality of markers to optimize the cost function associated with the plurality of edges in the pose graph.

17. The system of claim 16, wherein the sensor pose transform and the plurality of vehicle poses relative to the map are determined simultaneously to optimize the cost function associated with the plurality of edges in the pose graph.

18. The system of claim 16, wherein the program instructions are further executable by the computing system to the vehicle to make a series of movements based on previously mapped marker positions to determine the sensor pose transform.

19. A non-transitory computer readable medium having stored therein program instructions executable by a computing system to cause the computing system to perform operations, the operations comprising:

receiving sensor data indicative of a plurality of markers detected by a sensor on a vehicle located at a plurality of vehicle poses within an environment;

determining a pose graph representing the plurality of vehicle poses and the plurality of markers, wherein the pose graph comprises a plurality of edges associated with a cost function representing a distance measurement between a matching marker detection at different vehicle poses, wherein the distance measurement incorporates the different vehicle poses and a sensor pose on the vehicle, and wherein the plurality of vehicle poses are determined relative to a map of the plurality of markers to optimize the cost function associated with the plurality of edges in the pose graph;

determining a sensor pose transform representing the sensor pose on the vehicle that optimizes the cost function associated with the plurality of edges in the pose graph, wherein the sensor pose transform is determined subsequent to determining the plurality of vehicle poses, and wherein the plurality of vehicle poses are held fixed while determining the sensor pose transform; and providing the sensor pose transform representing the sensor pose on the vehicle.

20. The non-transitory computer readable medium of claim 19, wherein the sensor pose transform comprises a position and an orientation of the sensor relative to a coordinate frame fixed to the vehicle.

* * * * *